(12) United States Patent
Goldman

(10) Patent No.: US 6,243,520 B1
(45) Date of Patent: Jun. 5, 2001

(54) OPTICAL FIBER BUNDLE HAVING AN ALIGNED OPTICAL FIBER ARRAY AND METHOD OF FABRICATING THE SAME

(75) Inventor: Paul D. Goldman, Marlborough, MA (US)

(73) Assignee: Schott Fiber Optics, Inc., SouthBridge, MA (US)

( * ) Notice: Subject to any disclaimer, the term of this patent is extended or adjusted under 35 U.S.C. 154(b) by 0 days.

(21) Appl. No.: 09/375,074

(22) Filed: Aug. 16, 1999

(51) Int. Cl.[7] ........................................ G02B 6/04
(52) U.S. Cl. ........................ 385/115; 385/116; 385/120
(58) Field of Search ........................ 385/115, 116, 385/120, 16, 30, 24, 33, 39, 54, 46, 52, 59, 82

(56) References Cited

U.S. PATENT DOCUMENTS

| | | |
|---|---|---|
| 5,321,785 | 6/1994 | Iida et al. ........................ 385/85 |
| 5,377,286 | 12/1994 | Iida et al. ........................ 385/33 |
| 5,388,174 | 2/1995 | Roll et al. ........................ 385/50 |
| 5,394,498 | 2/1995 | Hinterlong et al. ........................ 385/115 |
| 5,446,815 | 8/1995 | Ota et al. ........................ 385/33 |
| 5,553,184 * | 9/1996 | Eikelmann et al. ........................ 385/115 |
| 5,703,973 | 12/1997 | Mettler et al. ........................ 385/14 |
| 5,715,345 * | 2/1998 | McKinley ........................ 385/115 |
| 5,812,726 | 9/1998 | Jinnai et al. ........................ 385/137 |
| 5,901,262 | 5/1999 | Kobayashi et al. ........................ 385/89 |
| 5,907,650 | 5/1999 | Sherman et al. ........................ 385/80 |

* cited by examiner

Primary Examiner—Phan T. H. Palmer
(74) Attorney, Agent, or Firm—Louis J. Franco

(57) ABSTRACT

An optical fiber bundle having an aligned fiber array includes a plurality of optical fibers each of which has first and second ends and an axial fiber center. The optical fiber bundle has a first common end proximate to which the optical fibers are secured in place by a first array fixture such that a fiber segment adjacent the first end of each optical fiber protrudes from the first array fixture. Each fiber segment of a selected plurality of fiber segments belongs to at least one microspacer neighborhood that includes at least two fiber segments secured in contacting engagement with a precision microspacer installed between the at least two fiber segments such that the axial fiber centers at the first ends of the at least two fiber segments are maintained in predetermined array positions with respect to one another.

42 Claims, 15 Drawing Sheets

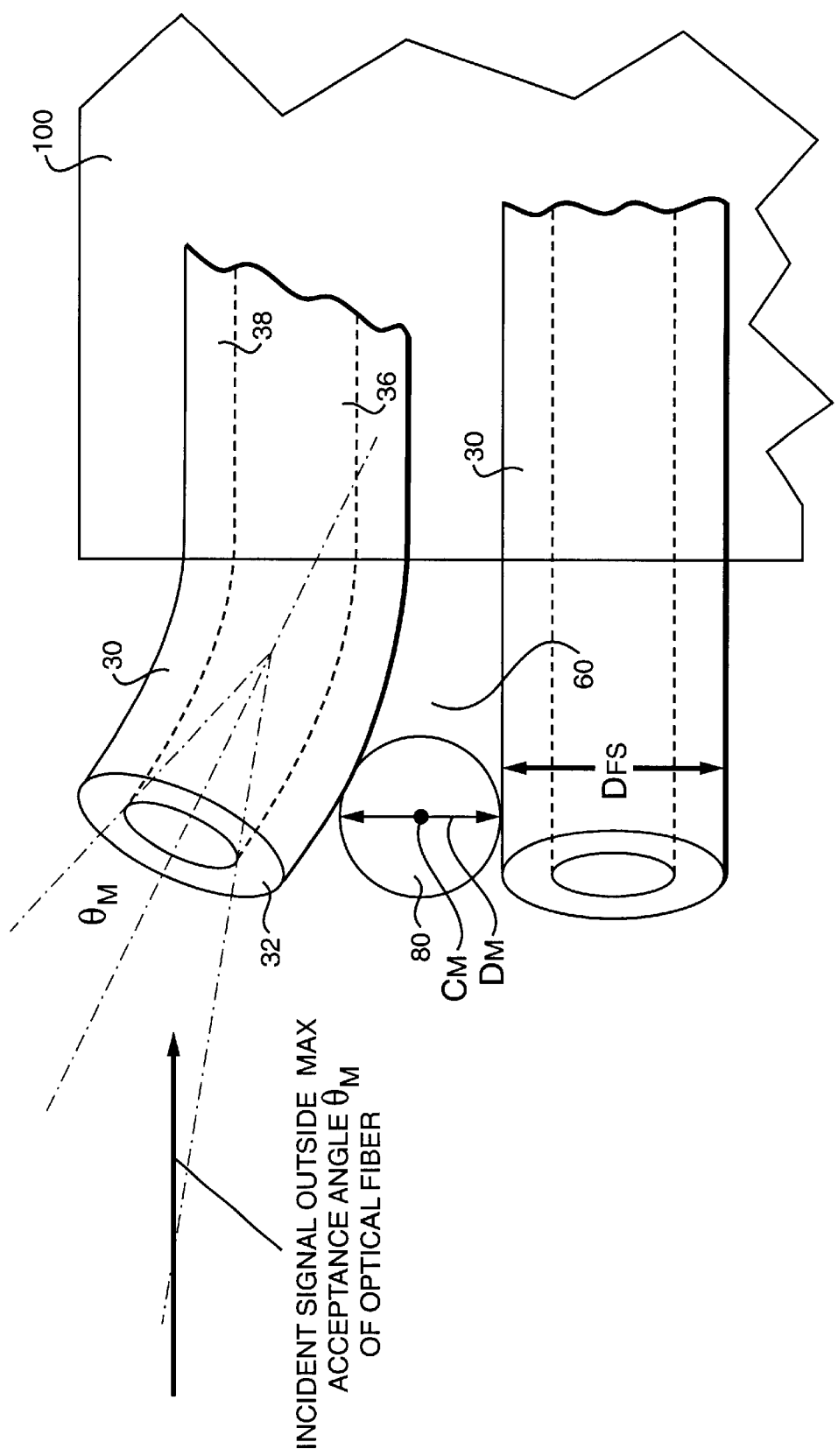

A method of fabricating an optical fiber bundle having an aligned fiber array using precision microspacers and comprising the steps of:

providing an optical fiber bundle comprising a plurality of elongated optical fibers each of which has first and second ends and an axial fiber center, the optical fiber bundle having at least a first common end proximate to which the optical fibers are aligned and retained by a first array fixture such that a fiber segment of each optical fiber protrudes beyond the first array fixture to the first end of the optical fiber, the fiber segments collectively having interstices therebetween and the axial fiber centers at the first ends of the optical fibers being arranged in an uncorrected first-end fiber array with respect to an ideal lattice relative to which there exists an ideal lattice position for the axial fiber center at the first end of each optical fiber;

installing a precision microspacer having a microspacer center into each interstice of a selected plurality of interstices to create microspacer neighborhoods, each microspacer neighborhood comprising a single microspacer located between at least two fiber segments; and securing the fiber segments in each microspacer neighborhood into contacting engagement with the precision microspacer such that the axial fiber centers at the first ends of the optical fibers are maintained in predetermined relative positions that more closely approximate their ideal lattice positions than the positions they occupied in the uncorrected first-end fiber array.

FIG. 8

A method of fabricating an optical fiber bundle having a precisely aligned optical fiber array using precision microspacers and comprising the steps of:

providing an optical fiber bundle comprising a plurality of elongated optical fibers each of which has first and second ends and includes a fiber core having an axial fiber center, an insoluble concentric inner cladding around the fiber core and a soluble concentric outer cladding around the inner cladding, the optical fiber bundle having at least a first common end at which the plurality of optical fibers is aligned and fused into a first array fixture for a first length beginning at their first ends and extending along the optical fibers such that the first ends of the optical fibers at an end face of the first array fixture are arranged in an uncorrected first-end fiber array with respect to an ideal lattice relative to which there exists an ideal lattice position for the axial fiber center at the first end of each optical fiber;

leaching the first common end of the optical fiber bundle to a leach depth that is less than the first length to dissolve the soluble concentric outer cladding from the optical fibers along a portion of their lengths extending between their first ends and a recessed first array face on the fused remainder of the first array fixture such that a fiber segment having a fiber core and an insoluble concentric inner cladding remains adjacent the first end of each leached optical fiber and protrudes out of the recessed first array face and that there exist interstices between the fiber segments in the uncorrected first-end fiber array;

installing a precision microspacer having a microspacer center into each interstice of a selected plurality of interstices to create microspacer neighborhoods, each microspacer neighborhood comprising a single microspacer located between at least two fiber segments; and

securing the fiber segments in each microspacer neighborhood into contacting engagement with the precision microspacer such that the axial fiber centers at the first ends of the optical fibers are maintained in predetermined relative positions that more closely approximate their ideal lattice positions than the positions they occupied in the uncorrected first-end fiber array.

FIG. 9

OPTICAL FIBER BUNDLE HAVING AN ALIGNED OPTICAL FIBER ARRAY AND METHOD OF FABRICATING THE SAME

BACKGROUND

The fabrication of fused and flexible optical fiber bundles for the purpose of transmitting electromagnetic signals from a signal-receiving end to a signal-emitting end of the optical fiber bundle is an evolving technology.

Optical fiber bundles arranged in one and two-dimensional arrays of signal transmitting optical fibers can be used as "optical fiber interconnects" to connect one and two-dimensional arrays of electromagnetic signal sources (e.g., photodiode arrays) and detectors in order to eliminate data transmission bottlenecks that arise in advanced digital systems communicating over short distances, for example. The practical implementation and usefulness of optical fibers as "optical fiber interconnects" requires optimum alignment of the optical fibers at at least one of the signal-receiving and signal-emitting ends of the fibers within an optical fiber bundle. Precision alignment of the optical fiber ends into an array at at least one common end of an optical fiber bundle is important in order to achieve efficiency in signal reception by, and transmission through, the optical fibers in the optical fiber bundle. An important measure of precision is how far the position of the axial center of any given fiber deviates from its ideal position. That is, how precisely are the desired distances between the axial center of a particular fiber maintained with respect to the axial centers of its neighboring fibers in an array (i.e., "center-to-center spacing"). The problem may also be expressed in terms of how closely the positions of the axial centers of the fibers approximate their objective, ideal lattice positions. Despite extensive, industry-wide research and development efforts, precision alignment of optical fiber ends, for these and other applications, has proved to be a vexing and elusive obstacle.

In some cases, fixtures have been used in an attempt to achieve precisely aligned arrays of optical fiber ends. Specifically, individual fibers have been adhered to array blocks or other fixtures where they are held in place with epoxy, for example. Some versions of this technique have called for individual fibers to be feed through individual holes in an array block and then fixed in place with epoxy or placed and adhered in channels created by micromachining or lithography, for example. The effectiveness and the degree of precision achievable by such techniques standing alone are limited by the precision with which the channels can be formed and spaced and by the precision with which the optical fibers can be placed and set therein.

Representative of recent attempts to achieve precise two dimensional arrays of optical fibers is a method for aligning optical fibers described by C. V. Cryan in a paper entitled "Two-dimensional multimode fibre array for optical interconnects," *Electronics Letters*, Vol. 34 No. 6, Mar. 19, 1998, p. 586. In the method described by Cryan, each optical fiber within the array is fabricated using the rod in tube method, as is known in the art. The fiber preform comprises a central core rod, a concentric inner cladding tube over the central core rod and a concentric outer cladding tube that fits over the inner cladding tube. Each fiber preform is then drawn into fused fiber rods using industry-standard equipment and methods. The diameter and cross-section of each fiber rod is carefully monitored and controlled during the drawing stage.

The resulting fused fiber rods are then aligned into a lattice configuration to form a modified array preform. According to Cryan, reasonably precise alignment of the fiber rods is possible due to their large diameter and flexural rigidity. The array preform is then drawn, fused and segmented to yield a multiplicity of array rods. During the draw stage of the array preform, the concentric outer glass tubes of the individual fiber rods within the array fuse with those of their neighboring rods thereby filling interstitial gaps within the array. The end faces of the array rods are polished perpendicular to the optical fiber rod axes to produce a straight, rigid optical fiber array. If desired, the rigid array can then be shaped in a heated former to produce a rigid data conduit.

Cryan further teaches that, when the outer concentric cladding tube of each optical fiber is an acid soluble glass, a flexible array can be fabricated by removing the acid soluble glass around each fiber along the length of the array rods, while a fused section is preserved at each end. As is known in the art, selective glass removal may be achieved by masking the ends of the array with an acid resistant coating and then leaching the array in a dilute acid solution to remove the unmasked glass between the ends.

Ultimately, Cryan's method involves the heating and drawing of bundled optical fibers to create a fused optical fiber bundle. As a matter of general observation, variability in the heating and drawing process renders very precise fiber alignment at the array face extremely difficult to achieve with regularity. Specifically, observation and experimentation indicate that the deviation from an ideal array is usually caused more by the relative positions of the optical fibers then by imperfections, inconsistencies or deviations in the fiber diameters and geometries themselves. This is because, during the heating and drawing process, the claddings of the constituent fibers in the bundle become very soft and molten-like allowing the fiber core to drift from its ideal lattice position.

For the foregoing reasons, there is a need for a reliable method and apparatus in which optical fibers are precisely aligned in an array.

SUMMARY

The present invention is directed to a method and apparatus which, in some versions thereof, may be applied to the problem of aligning the ends of optical fibers at a common end of an optical fiber bundle into a precise array so that the optical fiber bundle is suitable for use as an optical fiber interconnect.

In one embodiment, an optical fiber bundle having an aligned first end fiber array with features of the present invention includes a plurality of optical fibers each of which has a first end and a second end, a fiber core with an axial fiber center and a concentric cladding around the fiber core that extends between the first and second ends. The optical fiber bundle has at least a first common end proximate to which the optical fibers are secured in place by a first array fixture. The optical fibers are secured by the first array fixture such that a fiber segment adjacent the first end of each optical fiber protrudes from the first array fixture. The axial fiber centers, at the first ends of selected sets of optical fibers, are maintained in predetermined positions with respect to one another by a plurality of precision microspacers installed between the fiber segments and secured in contacting engagement therewith. More specifically, each fiber segment of a selected plurality of fiber segments belongs to at least one microspacer neighborhood wherein each microspacer neighborhood comprises at least two fiber segments secured in contacting engagement with a precision microspacer installed between the at least two fiber segments such that the axial fiber centers at the first ends of the at least two fiber segments are maintained in predetermined array positions with respect to one another.

The optical fiber bundle itself may be of various forms. One such form is to have an optical fiber bundle with a first end fiber array from which the constituent optical fibers extend and terminate at their second ends in no particular configuration and at various locations. In another form, the optical fibers may be aligned in one fiber array at their first ends and in another fiber array at their second ends. In such cases, the fiber arrays at opposite ends of the optical fibers in the optical fiber bundle may or may not be of similar configuration and, furthermore, may or may not form a coherent bundle. In another alternative form, the optical fibers having their first ends in the first end fiber array may depart therefrom to form various sub-bundles that terminate in different fiber arrays.

In alternative embodiments, the precision microspacers may be in the form of precisely fabricated spheres (i.e., "microspheres") or rods (i.e., "microrods"). The microrods may be of various cross-sectional geometries including circular, that of a parallelogram or that of a regular polygon such as an equilateral triangle, a square, a pentagon, a hexagon, a heptagon, or an octagon, for example. In addition, they may be of irregular cross-sectional geometries such as irregular polygons or of cross-sectional geometries including those of a rhombus, a cross or a "T," for example. The precision microspacers may be fabricated from one or more of a variety of inelastic materials such as glass, resin, epoxy resin, plastic, or metal, for example. Furthermore, the optical fibers may be of at least as many different cross-sectional geometries as the precision microspacers. Frequently, it will be desirable in practice for all of the precision microspacers to be of similar form and size and all of the optical fibers to be of similar form and size in any particular embodiment. However, embodiments in which the first end fiber array includes precision microspacers and optical fibers and fiber segments of various and non-uniform size and form are within the scope and contemplation of the invention.

The first array fixture may be of various forms and materials including, for example, a molded or machined block of glass, plastic, or metal or an epoxy resin with holes, channels or grooves therein or therethrough for receiving optical fibers and maintaining them in position as with an adhesive, for example. Alternatively, the first array fixture may be in the form of a mechanical clamp, band or sleeve disposed around the perimeter of the fiber bundle which maintains the optical fibers in place with inwardly directed force. In one embodiment, the first array fixture comprises the fused claddings of the plurality of optical fibers within the optical fiber bundle in accordance with techniques ubiquitously applied in the fiber optics industry in the making of rigid and partially rigid fiber bundles.

In alternative embodiments, the fiber segments of each microspacer neighborhood may be arranged in various configurations. In one embodiment, the array of fiber segments includes microspacer neighborhoods having at least three fiber segments of similar cross-sectional geometry and substantially equal diameter secured in contacting engagement with the precision microspacer wherein the predetermined positions in which the axial fiber centers at the first ends of the optical fibers are maintained correspond to the vertices of an imaginary regular polygon and/or the vertices of an imaginary parallelogram, the perimeter of which encloses the precision microspacer when superimposed over the fiber segments in a plane substantially perpendicular to the axial fiber centers. In one version of such an embodiment, all of the fiber segments protruding from the first array fixture are of similar cross-sectional geometry and substantially equal diameter and, furthermore, every fiber segment protruding from the first array fixture is among the selected plurality of fiber segments belonging to at least one microspacer neighborhood.

In another configuration, each microspacer neighborhood comprises four fiber segments secured in engagement with a precision microspacer. The fiber segments in each microspacer neighborhood are of similar cross-sectional geometry and substantially equal diameter and the predetermined positions in which the axial fiber centers at the first ends of the optical fibers are maintained correspond to the vertices of an imaginary parallelogram the perimeter of which imaginary parallelogram encloses the precision microspacer in the general manner described previously.

An optical fiber bundle having an aligned first end fiber array may be fabricated by one or more of the illustrative methods described below.

In one embodiment, a method of fabrication may begin by providing an optical fiber bundle comprising a plurality of elongated optical fibers each of which has first and second ends, a fiber core with an axial fiber center and a concentric fiber cladding disposed around the fiber core and extending between the first and second ends. The uncorrected optical fiber bundle to which the method is to be applied will have at least a first common end at which the plurality of optical fibers is aligned and retained in position at and by a first array fixture. The optical fibers are generally aligned and secured at the first array fixture such that a fiber segment of each optical fiber extends beyond the first array fixture to the first end of the optical fiber and such that there are interstices between the fiber segments. The first array fixture retains the optical fibers in a configuration and may be of one or more of the forms and materials previously mentioned.

At this stage, the first ends of the optical fibers are configured in an uncorrected first-end fiber array with respect to an ideal lattice relative to which there exists an ideal lattice position for the axial fiber center at the first end of each optical fiber. The degree to which the axial fiber centers deviate from their ideal lattice positions is a measure of the precision of an optical fiber array.

To improve the precision of (i.e., correct) the uncorrected first-end fiber array, the method of the present invention includes the step of installing a precision microspacer having a microspacer center into each interstice of a selected plurality of interstices in the first end fiber array to create microspacer neighborhoods. Each microspacer neighborhood comprises a single microspacer located between at least two fiber segments.

Once the precision microspacers have been installed in the selected plurality of interstices, the optical fiber segments in each microspacer neighborhood are urged and secured into contacting engagement with the precision microspacer such that the axial fiber centers at the first ends of the optical fibers are retained in predetermined relative positions that more closely approximate their ideal lattice positions than the positions they occupied in the uncorrected first-end fiber array.

The securing into contacting engagement of the fiber segments with the precision microspacer in a microspacer neighborhood may be accomplished by one or more of the following, for example: by applying a peripheral binding structure around the periphery of the first-end fiber array as a whole; by applying a bonding adhesive such as an epoxy or high-shrinkage adhesive to the precision microspacers and the fiber segments individually at the first common end; and by "freezing" the individual fiber segments to the precision microspacer in each mircrospacer neighborhood by applying a bonding adhesive such as a light-curable or a UV-curable epoxy to the fiber segments and the precision microspacer and curing with light or UV light. Depending on what method or device is used to secure the fiber segments into contacting engagement with the precision microspacers, it may be desirable to grind and polish the first common end to form a smooth first array face containing the first ends of the optical fibers.

In one embodiment, the ideal lattice positions of the optical fiber centers at the first ends of the optical fibers in each microspacer neighborhood are such that the axial fiber centers of the optical fibers are equidistant from the microspacer center. Normally, the equidistance may be defined with respect to the lengths of reference line segments extending perpendicularly from the axial fiber centers and inward to the microspacer center, provided that the fiber segments in each microspacer neighborhood are secured so that they are substantially parallel to one another. Furthermore, the axial fiber centers may be equispaced about the microspacer center. However, while substantially parallel alignment of the fiber segments with respect to one another may be desirable, the larger concern is the actual positions of the axial fiber centers at the first ends of the optical fibers. As such, alternative arrangements for those positions have been and will be described without regard to whether the fiber segments are substantially parallel to one another.

As mentioned previously, the precision microspacer at the center of a microspacer neighborhood may have a cross-sectional geometry that is circular or that of a regular polygon, for example, to facilitate the desired arrangement of the fiber segments. Another possibility is to provide a precision microspacer having one concave surface on its periphery corresponding to each fiber segment with which it is to be secured in contacting engagement. For example, for precision microspacers designed to be secured at the center of a microspacer neighborhood having three fiber segments, a precision microspacer having three concave surfaces may be provided. Furthermore, the three concave surfaces may be separated by angles of 120° (i.e., equispaced) where it is desired that the axial fiber centers at the first ends of the optical fibers correspond to the vertices of an equilateral triangle, for example. In the case of a microspacer neighborhood having only two fiber segments, a precision microspacer having two opposed concave surfaces might be used, although it will be readily appreciated that, in microspacer neighborhoods having only two fiber segments, the axial fiber centers thereof will not typically be arranged so as to correspond to the vertices of a regular polygon or a parallelogram.

Another illustrative method of fabricating a precisely aligned optical fiber array involves an optical fiber bundle in which the optical fibers are fused together at least partially along their lengths. Specifically, this method may begin by providing an optical fiber bundle comprising a plurality of elongated optical fibers each of which has first and second ends, a fiber core with an axial fiber center, an insoluble concentric inner cladding around the fiber core and a soluble concentric outer cladding around the inner cladding. The optical fiber bundle further includes at least a first common end at which the plurality of optical fibers is aligned and fused into a first array fixture for a first length beginning at the first ends of the optical fibers such that the first ends of the optical fibers, at an end face of the first array fixture, are arranged in an uncorrected first-end fiber array with respect to an ideal lattice relative to which there exists an ideal lattice position for the axial fiber center at the first end of each optical fiber.

The first common end of the optical fiber bundle is then leached to a leach depth that is less than the first length to dissolve the soluble concentric outer cladding from the optical fibers along a portion of their lengths extending between their first ends and a newly created recessed first array face on the fused remainder of the first array fixture. At this stage, a fiber segment having a fiber core and an insoluble concentric inner cladding remains adjacent the first end of each leached optical fiber and extends out of the recessed first array face of the fused remainder of the first array fixture. Furthermore, after leaching, there will exist interstices between the fiber segments in the uncorrected first-end fiber array.

As is known in the art, the soluble concentric outer cladding may be an acid-soluble glass, for example, that may be dissolved by a concentrated or dilute acid solution while the insoluble concentric cladding may be a glass that is not as readily susceptible to dilution by the same acid solution, for example. Selective glass removal and the appropriate combinations of cladding materials and solvents are well known to, or readily ascertainable by, those of ordinary skill in the art. The particular materials from which the fibers are made, the solutions and the parameters of leaching are of no particular importance.

Subsequent to leaching, a precision microspacer having a microspacer center is installed into each interstice of a selected plurality of interstices to create microspacer neighborhoods, each of which microspacer neighborhoods comprises a single microspacer located between at least two fiber segments.

After installation of the precision microspacers, the fiber segments in each microspacer neighborhood are urged and secured into contacting engagement with the precision microspacer in that neighborhood such that the axial fiber centers at the first ends of the optical fibers are maintained in predetermined relative positions that more closely approximate their ideal lattice positions than the positions they occupied in the uncorrected first-end fiber array. The various configurations of fibers within each microspacer neighborhood are commensurate with those described previously.

Among the advantages of the present invention is that it may be applied to the alignment of optical fiber ends in an uncorrected fiber array to create a more precise optical fiber array.

Another advantage of the present invention is that it may be applied to increase the precision of the alignment of optical fiber ends in fiber arrays otherwise fabricated in accordance with known methods.

Another advantage of the present invention is that it may be applied to reduce the difficulty of precisely aligning optical fiber ends in a unitary optical fiber bundle that is at least partially fused.

It is another advantage of the present invention that, when applied to optical fiber bundles that are at least partially fused, it provides an opportunity to compensate for the imprecision in fiber alignment introduced during the heating and drawing stages of fused optical fiber bundle fabrication.

Still another advantage of the present invention is that, when applied to optical fiber bundles that are at least partially fused, it obviates the need for complete reliance upon precision heating and drawing by introducing the post-fusing corrective measure of installing precision microspacers to adjust the positions of the optical fiber ends as briefly described previously and in detail below.

Further details of the fabrication processes and of the nature of the components used in and resulting from the fabrication processes are reserved for discussion in the detail description.

BRIEF DESCRIPTION OF THE DRAWINGS

The above and other features, aspects, and advantages of the present invention will become more completely understood with regard to the following description, appended claims, and accompanying drawings in which:

FIG. 3 illustrates how radical imprecision in the alignment of fiber segments in an uncorrected first-end fiber array may be uncorrectable through installation of precision microspacers into interstices between the fiber segments;

FIG. 8 is a flowchart illustrating a method of fabricating an optical fiber bundle having an aligned fiber array using precision microspacers; and FIG. 9 is a flowchart illustrating a method of fabricating an optical fiber bundle having an aligned optical fiber array using precision microspacers.

DETAILED DESCRIPTION

Apparatus

Figure 1:
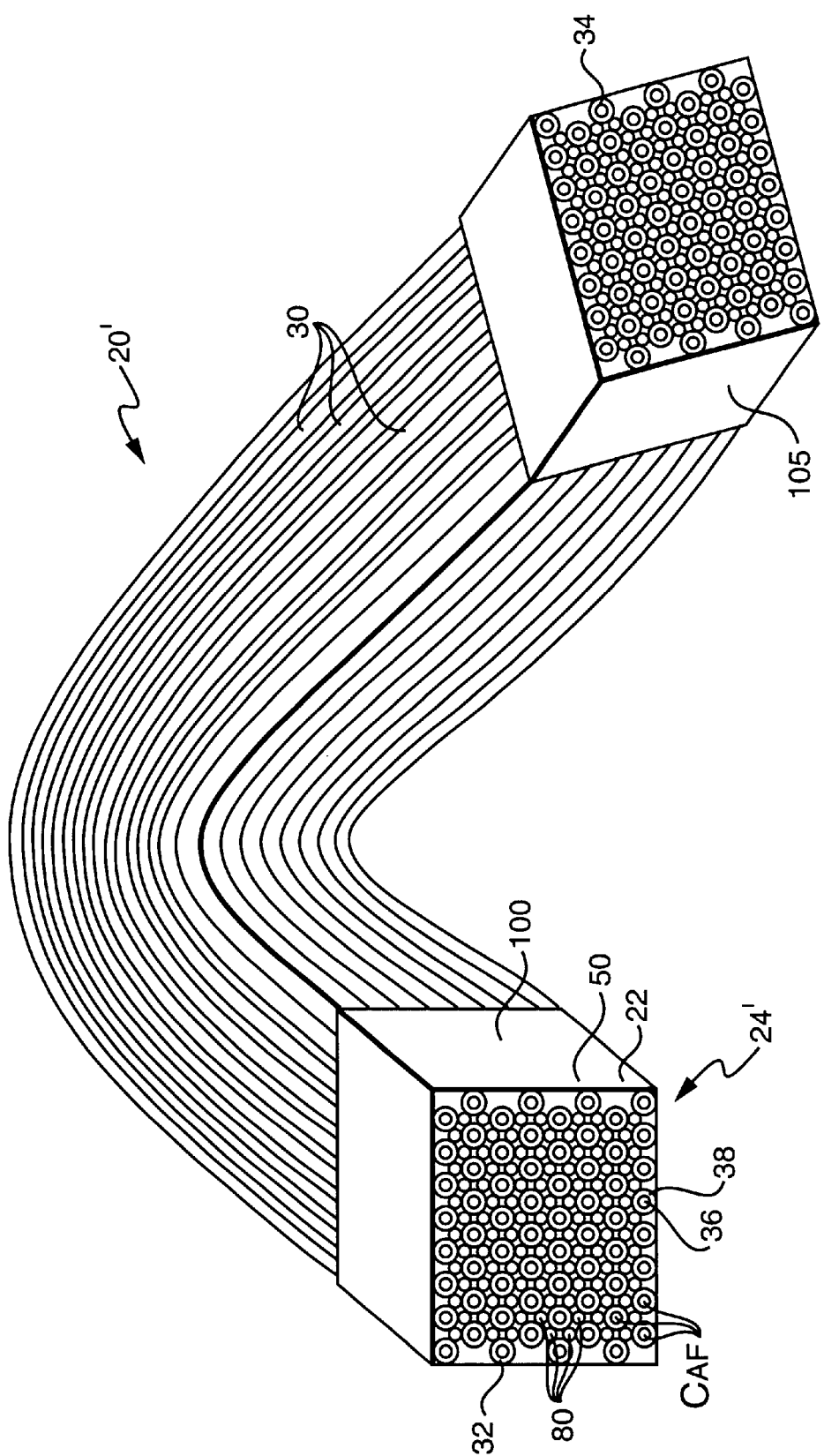
FIG. 1 is a perspective view of a corrected optical fiber bundle having an aligned first-end fiber array.

As shown in FIG. 1, a corrected optical fiber bundle 20' having an aligned first-end fiber array 24' comprises a plurality of elongated optical fibers 30 each of which has a first end 32 and a second end 34, a fiber core 36 with an axial fiber center $C_{AF}$ and a concentric cladding 38 around the fiber core 36 that extends between the first and second ends 32 and 34.

Holding the optical fibers 30 in place proximate at least a first common end 22 of the corrected optical fiber bundle 20' is a first array fixture 100. The optical fibers 30 are secured by the first array fixture 100 such that a fiber segment 50 adjacent the first end 32 of each optical fiber protrudes from the first array fixture 100. Preferably, the fiber segments 50 protrude from the first array fixture 100 by substantially the same distance.

There is no particular limitation on the form of the first array fixture 100 or the material from which it is constructed. For example, the first array fixture 100 may be a machined block of glass, plastic, metal, or epoxy resin with holes, channels or grooves therein or therethrough for receiving and securing optical fibers 30 with an adhesive. Alternatively, the first array fixture 100 may be in the form of a mechanical clamp or sleeve disposed around the perimeter of the bundle of optical fibers 30. In one embodiment, the first array fixture 100 comprises the fused concentric claddings 38 of the optical fibers 30 in a bundle. Each of these alternative forms is well known to persons of ordinary skill in the art.

The axial fiber centers $C_{AF}$, at the first ends 32 of selected optical fibers 30, are aligned and maintained in predetermined positions with respect to one another by a plurality of precision microspacers 80 installed between the fiber segments 50 and secured in contacting engagement therewith. Each fiber segment 50 of a selected plurality of fiber segments 50 belongs to at least one microspacer neighborhood including at least two fiber segments 50 secured in contacting engagement with a precision microspacer 80. The securement of the fiber segments 50 in contacting engagement with the precision microspacers 80 maintains the axial fiber centers $C_{AF}$ at the first ends 32 of the optical fibers 30 in predetermined array positions with respect to one another in an aligned first-end fiber array 24'.

A corrected optical fiber bundle 20' having the construction illustrated, or alternative constructions, may be fabricated by the methods described below. Furthermore, additional and alternative structures may be introduced below which may be included as part of apparatus aspects.

Method of Fabricating an Aligned Fiber Array Using Microspacers

The following description of methods of fabricating an aligned fiber array is demonstrative in nature and is not intended to limit the invention or its application of uses.

Figure 2A:
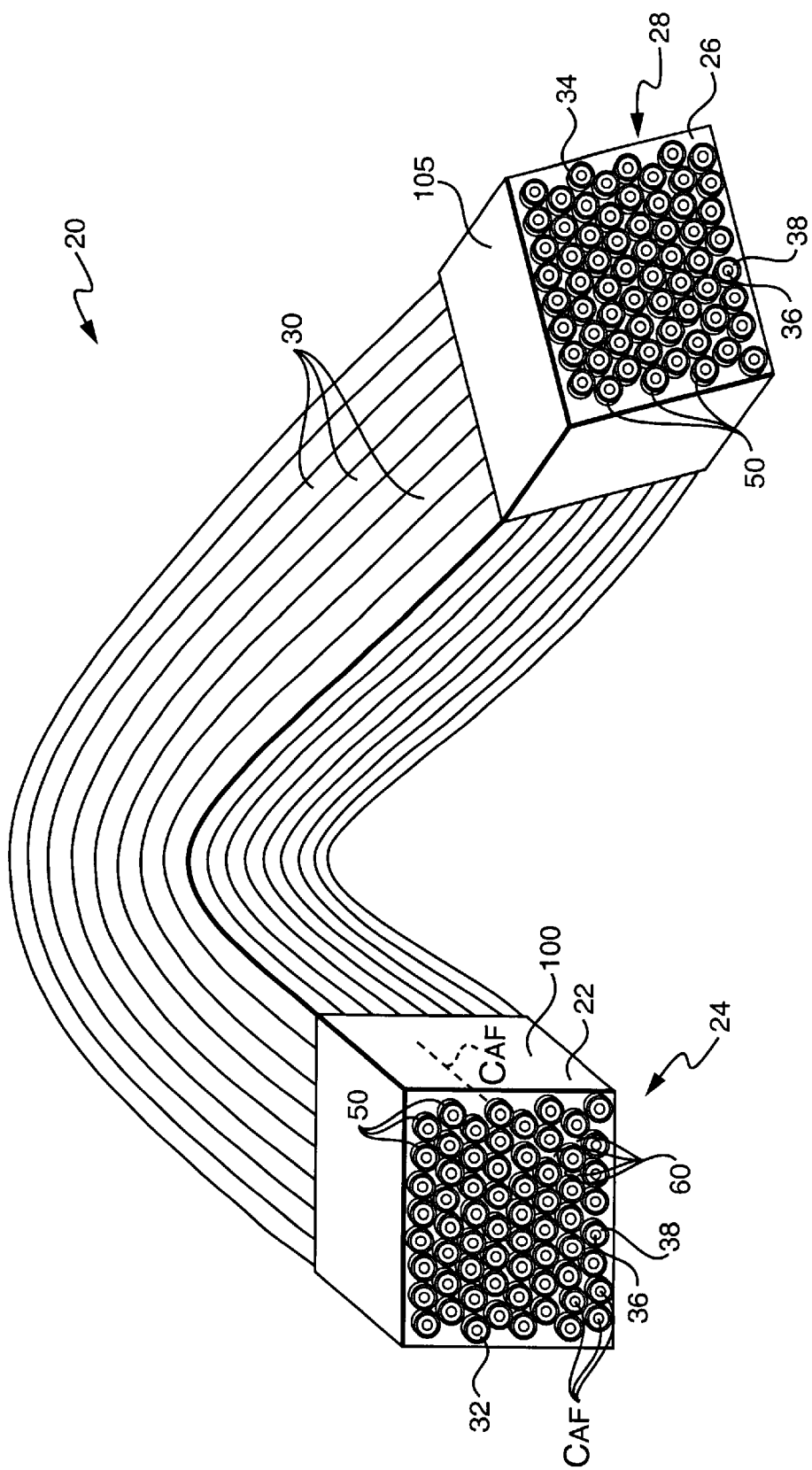
FIG. 2A is a perspective view of an uncorrected optical fiber bundle having fiber segments in an uncorrected first-end fiber array protruding from a first array fixture at a first common end of the uncorrected optical fiber bundle.
Figure 2B:
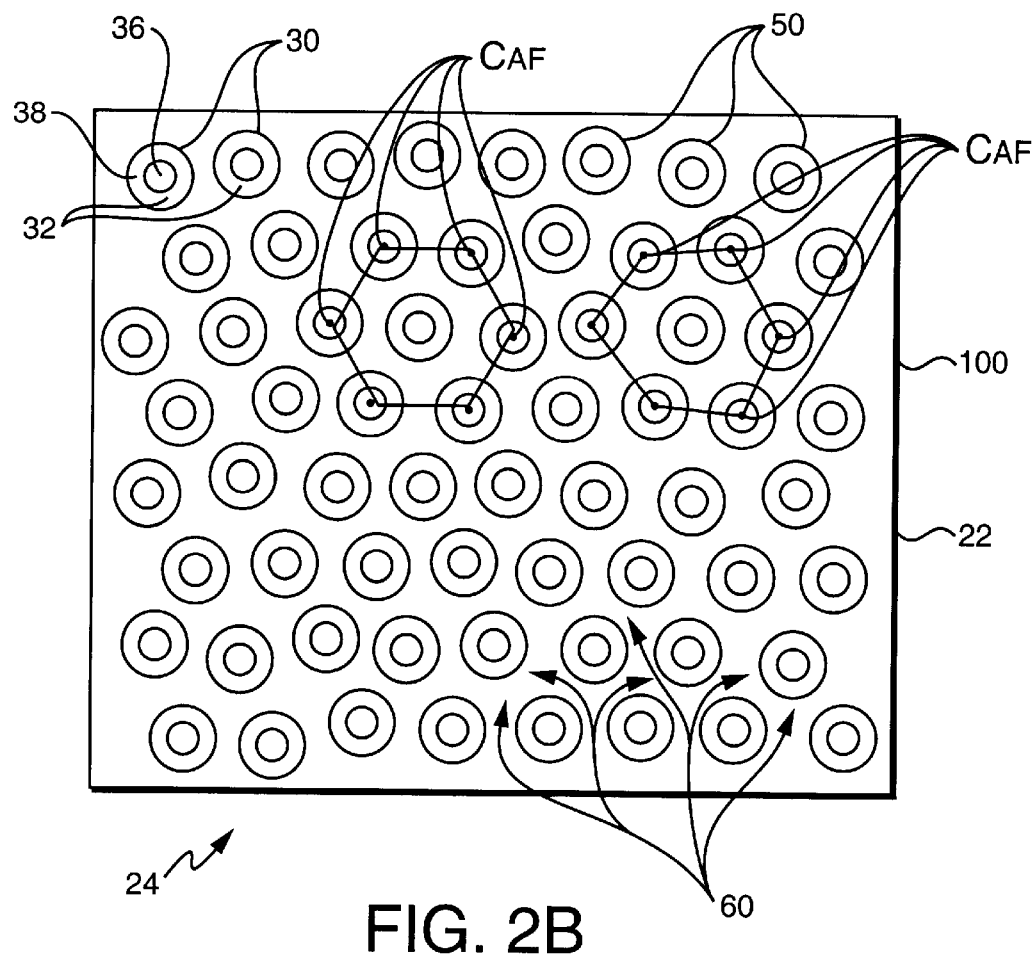
FIG. 2B is an end view of the uncorrected optical fiber bundle shown in FIG. 2A as viewed into the first common end.

A method of fabrication may be initiated by providing an uncorrected optical fiber bundle 20 comprising a plurality of elongated optical fibers 30 each of which has a first end 32 and a second end 34 and includes a fiber core 36 and a concentric fiber cladding 38 disposed around the fiber core 36 as shown in FIGS. 2A and 2B. The uncorrected optical fiber bundle 20 preferably has at least a first common end 22 at which the plurality of optical fibers 30 is aligned and secured in position at and by a first array fixture 100. The optical fibers 30 are secured at the first array fixture 100 such that a fiber segment 50 of each optical fiber 30 extends beyond the first array fixture 100 to the first end 32 of the optical fiber 30 and such that there are interstices 60 between the fiber segments 50. The first array fixture 100 retains the optical fibers 30 in a configuration and may be in the form of a mechanical clamp or sheath made from a material of sufficient strength such as plastic or metal; a solid block of material such as plastic, glass, fused glass, metal, ceramic; or even a dried adhesive such as epoxy or epoxy resin.

At this stage, the first ends 32 of the optical fibers 30 are arranged in an uncorrected first-end fiber array 24 with respect to an ideal lattice relative to which ideal lattice each axial fiber center $C_{AF}$, at the first end 32 of each optical fiber 30, has an ideal lattice position. The degree to which the axial fiber centers $C_{AF}$ deviate from their ideal lattice positions is a measure of the precision of an optical fiber array. Shown in FIG. 2B is an end view of the uncorrected optical fiber bundle 20 shown in FIG. 2A as viewed into the first common end 22. In this particular case, the intent was to have the optical fibers 30 hexagonally arranged; it will be appreciated that if the ideal array had been achieved, the axial fiber centers $C_{AF}$, at the first ends 32 of the optical fibers 30, would be located at the vertices of an ideal hexagon. In FIG. 2B, an ideal hexagon is superimposed over a grouping of optical fibers 30 including six optical fibers 30 disposed around a central optical fiber 30 to illustrate the deviation of the axial fiber centers $C_{AF}$ from their ideal lattice positions. To further illustrate the deviation in the uncorrected first-end fiber array 24, the axial fiber centers $C_{AF}$ of another grouping of optical fibers 30 are connected by line segments; again, if an ideal array had been achieved, the shape traced out by these six line segments would be that of an ideal hexagon.

Figure 2C:
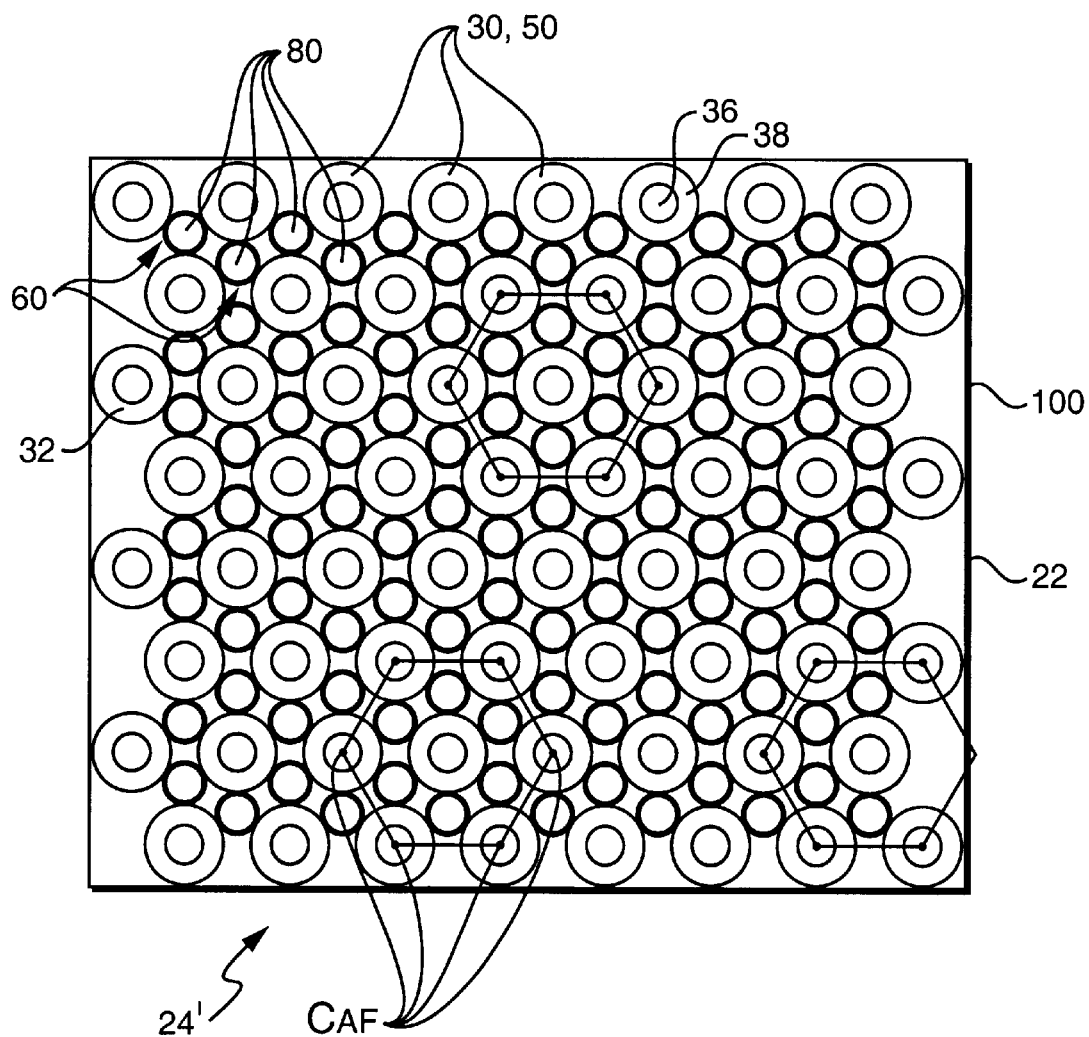
FIG. 2C is a view of the first common end shown in FIGS. 2A and 2B after the installation of precision microspacers and the securing of the fiber segments into contacting engagement therewith.
Figure 2D:
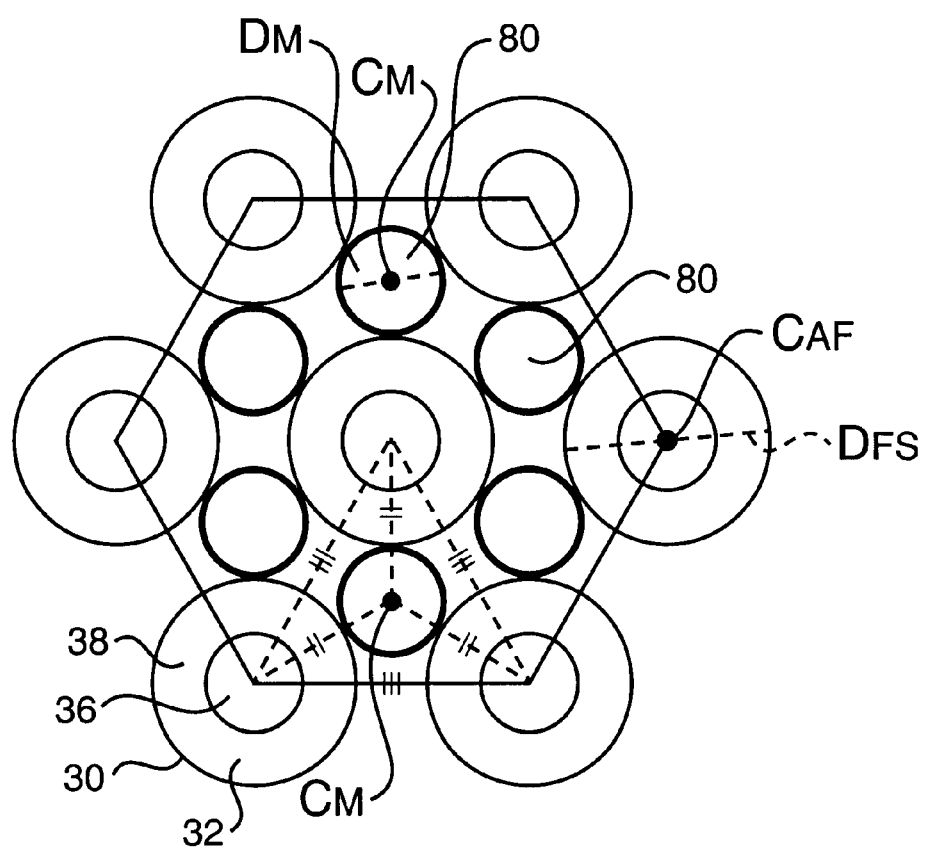
FIG. 2D is an enlarged view of one of the hexagonal regions shown in FIG. 2C.

Referring to FIGS. 2C and 2D, to correct (i.e., improve the precision of) the uncorrected first-end fiber array 24, the method includes the step of installing precision microspacers 80 into a selected plurality of interstices 60 between the fiber segments 50 in order to rearrange the axial fiber centers $C_{AF}$ of the optical fibers 30, at their first ends 32, toward predetermined positions that more closely approximate, or correspond, to their ideal lattice positions. It will be appreciated that in order for this method to work, the fiber segments 50 must have some degree of lateral flexibility to permit the movement of their first ends 32 toward their predetermined positions. As such, the fiber segments 50 should be sufficiently long to facilitate this objective.

FIG. 2D is an enlarged view of one of the hexagonal regions shown in FIG. 2C. As seen clearly in FIG. 2D, each precision microspacer 80 has a microspacer center $C_M$, a microspacer diameter $D_M$ and a cross-sectional microspacer geometry. Typically, the cross-sectional microspacer geometry will be that of a circle, a regular polygon or a parallelogram but need not be so limited. Furthermore, the precision microspacers 80 may be spherical (i.e., microspheres) or elongated rods (i.e. microrods) as previously discussed in the summary. It will be appreciated that axial alignment would be an issue when "microrods" are used whereas axial alignment is irrelevant in the case of a sphere. The precision microspacers 80 are preferably fabricated from any of a variety of inelastic materials such as glass, metal, plastic, and ceramic, for example. For use in environments susceptible to large variations in temperature, a material having a low coefficient of thermal expansion may be a preferred choice from which to fabricate the precision microspacers 80.

There are numerous alternative techniques for carrying out the actual installation of the precision microspacers 80 including, for example, individual placement by a person with the aid of a microscope and a microprobe and/or micro-tweezers, utilizing automated (e.g., CNC) pick-and-place equipment, and/or brushing the precision microspacers 80 into place. The technique of brushing the precision microspacers 80 into place would probably only be feasible where "microspheres" are used for obvious reasons, not the least of which is that the use of microspheres is the only scenario in which axial alignment is irrelevant, as stated previously.

The nature of the precision microspacers 80 having been described, it will be readily appreciated that, although the fiber segments 50 should be sufficiently long to facilitate lateral flexibility, they should not be so long that, when the precision microspacers 80 are inserted into the interstices 60, they are inserted so far beyond the first ends 32 of the optical fibers 30 that the first ends 32 are free to move back out of the desired alignment. This concern is especially relevant when the precision microspacers 80 being used are microspheres. If the fiber segments 50 are longer than the microspacer diameter $D_M$ to too great a degree, and a single precision microspacer 80 is inserted to its maximum depth, the first end 32 of the optical fiber 30 will be free to bend around the precision microspacer 80 and out of the desired alignment. Similarly, where microrods serve as the precision microspacers 80, care should be taken that the length of the microrods is not too much shorter than the length of the fiber segments 50. The fact that the interstices 60 may be too shallow or too deep relative to the dimensions of the precision microspacers 80 indicates that a reasonable degree of precision is desirable in the uncorrected first-end fiber array 24. An alternative possibility is to "stack" more than one precision microspacer 80 into each interstice 60, although doing so is less preferred.

Figure 2E:
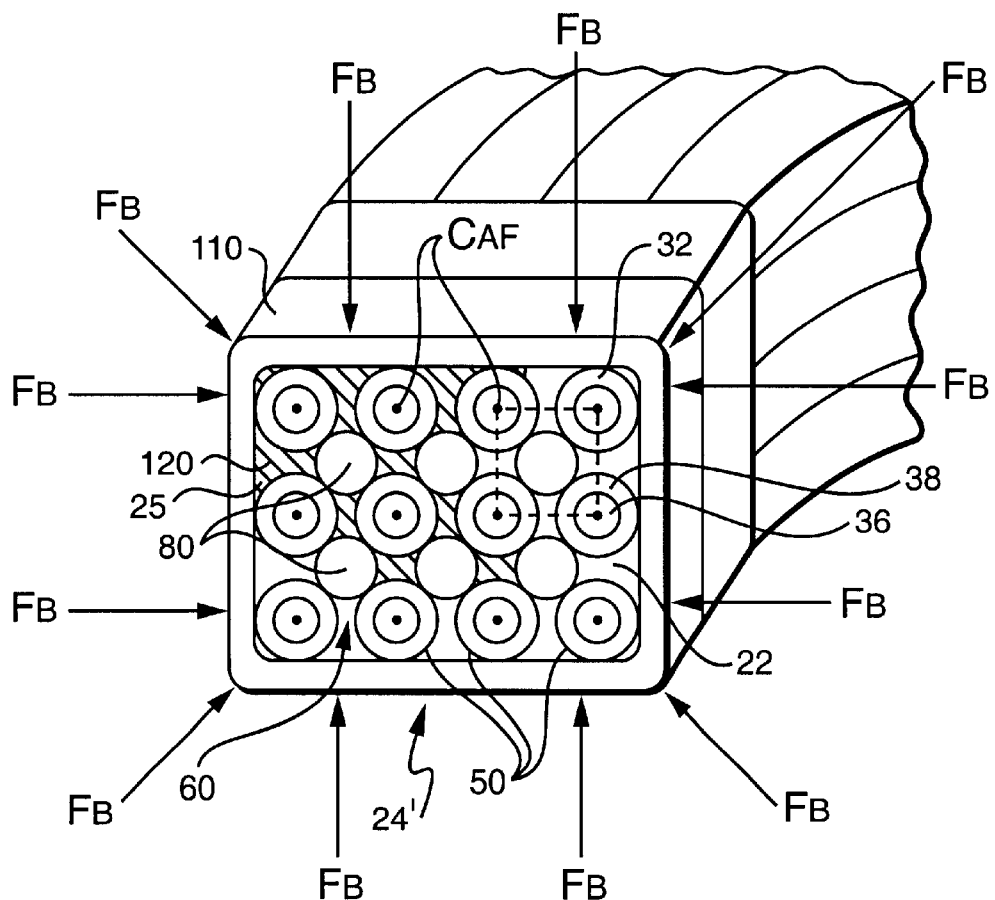
FIG. 2E illustrates alternative ways in which the fiber segments protruding from a first array fixture may be secured in contacting engagement with the precision microspacers.

Once the precision microspacers 80 have been installed in the selected plurality of interstices 60, the fiber segments 50 and the precision microspacers 80 are urged and secured into contacting engagement such that the uncorrected first-end fiber array 24 becomes a corrected first-end fiber array 24'. The uncorrected first-end fiber array 24 is "corrected" by the retention of the axial fiber center $C_{AF}$ at the first end 32 of each optical fiber 30 in a predetermined position that more closely approximates its ideal lattice position than that position occupied by it in the uncorrected first-end fiber array 24. The securing of the fiber segments 50 into contacting engagement with the precision microspacers 80 may be accomplished by various alternative methods and devices, either standing alone, or in combinations of two or more such methods and devices. Reference is made to FIG. 2E, which shows a 3×4 corrected first-end array 24' of fiber segments 50 for the purpose of discussing examples of the methods and apparatus that may be used. In this particular case, the axial fiber centers $C_{AF}$ at the first ends 32 of the optical fibers 30 are retained in positions corresponding to the vertices of a square. A peripheral binding structure 110 may be applied around the periphery of the fiber segments 50 in the first end fiber array 24/24' to exert inwardly directed binding forces $F_B$ around the entire periphery. If the inwardly directed binding forces $F_B$ are of sufficient magnitude, they may be relied upon alone to maintain the fiber segments 50 in contacting engagement with the precision microspacers 80 by friction. The peripheral binding structure 110 itself may be of various forms including, for example, a clamp, band, belt, sheath, sleeve or ribbon, and may be of one of more or a variety of materials including, for example, metal, plastic, high-shrinkage adhesive, synthetic resin, and/or epoxy. It will be appreciated that, where a peripheral binding structure 110 is used, and the fiber segments 50 and precision microspacers 80 are of cross-sectional geometries that will facilitate their sliding with respect to one another before final setting (e.g., where the fiber segments 50 and the precision microspacers 80 are of circular cross-section), the application of the inwardly directed binding forces $F_B$ may be used to urge the fiber segments 50 into their desired positions. If it is not desired to rely solely upon a peripheral binding structure 110 to maintain the fiber segments 50 in contacting engagement with the precision microspacers 80, a bonding adhesive 120 may also be applied over the first common end 22 as a whole or just in selected locations. The adhesive 120 may be applied to completely or partially fill any remaining interstices 60 between or among the fiber segments 50 and the precision microspacers 80. There is no particular limitation on the type of adhesive 120 that may be applied and examples include glue; epoxy; light-cured epoxy, including UV-cured epoxy; heat-cured epoxy; or high-shrinkage adhesive. Furthermore, if it is not desired that a permanent peripheral binding structure 110 be applied, the first end fiber array 24/24' may be temporarily bound while a bonding adhesive 120 is applied and allowed to cure, and then removed so that the fiber segments 50 are maintained in contacting engagement with the precision microspacers 80 solely by the adhesive 120.

Typically, the application of peripheral binding forces $F_B$ to move, or at least to temporarily or permanently maintain, the fiber segments 50 and precision microspacers 80 in their desired positions with respect to one another will be most effective when the selected plurality of interstices 60 is such that every fiber segment 50 protruding beyond the first array fixture 100 belongs to at least one microspacer neighborhood. For example, consider the first end fiber array 24/24' in FIG. 2E. In this case, the desired configuration of the fiber segments 50 is clearly such that the axial fiber centers $C_{AF}$ at the first ends 32 of the optical fibers 30 correspond to the vertices of a square. Now consider the probable result if the lower right-hand precision microspacer 80 had not been installed thereby leaving an empty interstice 60 amongst the lowermost right-hand set of four fiber segments 50. If the inwardly directed binding forces $F_B$ were applied, the lowermost right-hand set of four fiber segments 50 would be forced together in a distorted configuration by virtue of the absence of a precision microspacer 80.

Another alternative for securing the fiber segments 50 into contacting engagement with the precision microspacer 80 in each microspacer neighborhood is to manipulate each fiber segment 50 of a selected plurality of fiber segments 50 individually into its desired position in contacting engagement with the precision microspacer 80 and then adhere the fiber segment 50 in place. Where the fiber segments 50 and the precision microspacers 80 are too small to be seen with the naked eye, this procedure may be performed with the aid of a microscope. Again, the individual fiber segments 50 may be adhered in place in a variety of ways, including by use of locally applied bonding adhesive 120 of the type previously described, for example. Once the selected individual fiber segments 50 have been secured in their desired positions, a layer of adhesive 120 may be applied over the entire first common end 22 to fill any remaining interstices 60 and create a more solid and uniform corrected first-end fiber array 24'.

Depending on how the fiber segments 50 are secured into contacting engagement with the precision microspacers 80, it may be desirable to grind and polish the first common end 22 to form a smooth end face 25 containing the first ends 32 of the optical fibers 30. This will be particularly true, for example, where epoxy is used since the application of epoxy is likely to result in bumpy, irregular surfaces. If a bonding adhesive 120 is applied over the entire first common end 22 to fill remaining interstices 60 as previously described, the first ends 32 of the optical fibers 30 will be covered in the adhesive 120; polishing may be the most effective way of removing excess adhesive 120 from the first ends 32 of the optical fibers 30 and to create a smooth end face 25 in which the first ends 32 are re-exposed.

In one embodiment, the fiber segments 50 in the uncorrected fiber bundle 20 are of substantially equal fiber-segment diameter $D_{FS}$ and of similar cross-sectional geometry. In such cases, it is envisioned that in the corrected first-end fiber array 24', a precision microspacer 80 will be installed and secured in an interstice 60 between at least a pair of fiber segments 50 to create a microspacer neighborhood. The precise number of fiber segments 50 between which any single precision microspacer 80 is positioned, and with which it is secured in contacting engagement in a given microspacer neighborhood, will depend on such factors as the fiber-segment diameters $D_{FS}$ and cross-sectional geometry of the fiber segments 50; the microspacer diameters $D_M$ and the cross-sectional geometry of the precision microspacers 80; the ratio of the fiber-segment diameters $D_{FS}$ versus the microspacer diameters $D_M$; and the desired lattice arrangement of the fiber segments 50. However, regardless of the number of fiber segments 50 in any given microspacer neighborhood, a condition to which one embodiment aspires is that the fiber segments 50 in each microspacer neighborhood be secured in contacting engagement with the precision microspacer 80 such that the axial fiber centers $C_{AF}$ of the fiber segments 50 are substantially parallel to one another and equidistant from the microspacer center $C_M$.

When the conditions of the immediately previous scenario are met, and there are, furthermore, at least three fiber segments 50 in a given microspacer neighborhood, the fiber segments 50 may be arranged with their axial fiber centers $C_{AF}$ equispaced about the microspacer center $C_M$ such that their axial fiber centers $C_{AF}$, at the first ends 32 of the optical fibers 30 correspond to the vertices of a regular polygon. For example, consider the desirable case previously referenced in FIG. 2D of a complete fiber neighborhood of hexagonally arranged fiber segments 50 (i.e., a fiber neighborhood comprising six fiber segments 50 hexagonally disposed around and secured to a central fiber segment 50 via six precision microspacers 80). In this case, each of the six precision microspacers 80 will be at the center of its own microspacer neighborhood where it will be secured in contacting engagement with each of three fiber segments 50. Furthermore, the axial fiber centers $C_{AF}$ at the first ends 32 of the three fiber segments 50 in each microspacer neighborhood will correspond to the vertices of an equilateral triangle. It will be appreciated that incomplete fiber neighborhoods and microspacer neighborhoods may exist near the perimeter of the corrected first-end fiber array 24' as shown in FIG. 2C. Whether incomplete neighborhoods exist in any given array will depend in part on the configuration of the optical fibers 30 in the array.

Although substantial parallel alignment of the fiber segments 50 is a desirable condition within each microspacer neighborhood, what is more important is the positions in which the axial fiber centers $C_{AF}$ at the first ends 32 of the optical fibers 30 are maintained. It will be appreciated that the axial fiber centers $C_{AF}$ at the first ends 32 of the optical fibers 30 may be maintained in desirable positions without the fiber segments 50 to which they belong being parallel or even substantially parallel. This point and others will be appreciated in the paragraph to follow.

Although it is an advantage of this method that it may be applied to correct, or compensate for, imprecision in optical fiber arrays assembled by known methods, radical imprecision in the initial uncorrected first-end fiber array 24 may be unsusceptible to correction by the installation of precision microspacers 80. Therefore, it is desirable that reasonable efforts at precision be made during the fabrication of the uncorrected first-end fiber array 24. If the first ends 32 of the optical fibers 30 deviate too far from their ideal lattice positions in the uncorrected first-end fiber array 24 they may not be able to be flexed far enough to satisfactorily approximate their ideal lattice positions in the corrected first-end fiber array 24'. Secondly, even if they can be so flexed, flexing them at angles greater than the maximum acceptance angle $\theta_M$ of the optical fibers 30 is unacceptable because the signal-receiving and transmitting capability of the optical fibers 30 will be lost. Such an extreme case is illustrated in FIG. 3 in which the optical fiber 30 in the top of the illustration has been bent to such a degree by the installation of the precision microspacer 80 (in this case a microsphere) that the incident signal is outside the maximum acceptance angle $\theta_M$ of the optical fiber 30.

Although the principles, scope and applicability of these methods are not limited by the cross-sectional geometries of the fiber segments 50 or microspacers 80; fiber diameters $D_F$ or microspacer diameters $D_M$ or particular configurations of optical fibers 30 and fiber segments 50, FIGS. 4A through 4E, 5A through 5D and 6A through 6G illustrate various sample configurations of complete microspacer neighborhoods within the scope and contemplation of the invention.

Figure 4A:
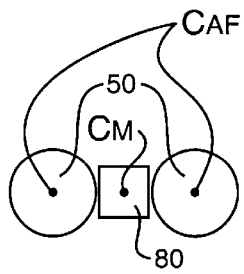
FIGS. 4A through 4E; and 5A through 5D and 6A through 6G illustrate various illustrative configurations of complete microspacer neighborhoods within the scope and contemplation of the invention.
Figure 4B:
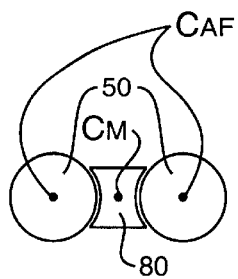
Figure 4C:
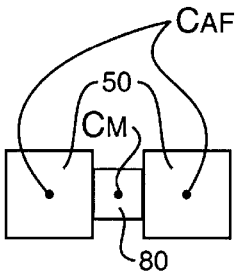
Figure 4D:
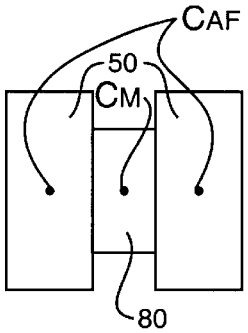
Figure 4E:
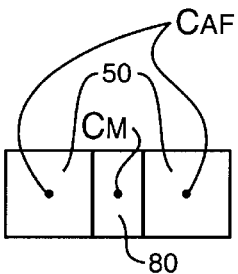

FIGS. 4A through 4E are samples of microspacer neighborhoods including two fiber segments 50 in contacting engagement with a precision microspacer in which the axial fiber centers $C_{AF}$ are substantially equidistant from the microspacer center $C_M$. FIG. 4A shows a pair of fiber segments 50 having circular cross-sectional geometries maintained in spaced relationship by a precision microspacer 80 of square cross-sectional geometry. FIG. 4B is an example of a microspacer neighborhood in which two fiber segments 50 are maintained in contacting engagement with a precision microspacer 80 with one concave surface for receiving one each of the two fiber segments 50 in complementary fashion. FIG. 4C shows two fiber segments 50 of square cross-sectional geometry secured in contacting engagement with a precision microspacer 80 of square cross-sectional geometry. FIG. 4D shows two fiber segments 50 of rectangular cross-sectional geometry secured in contacting engagement with a precision microspacer 80 of rectangular cross-sectional geometry. FIG. 4E illustrates two fiber segments 50 of square cross-sectional geometry secured in contacting engagement with a precision microspacer 80 of rectangular cross-sectional geometry.

Figure 5A:
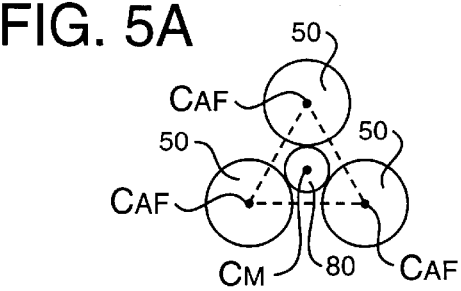
Figure 5B:
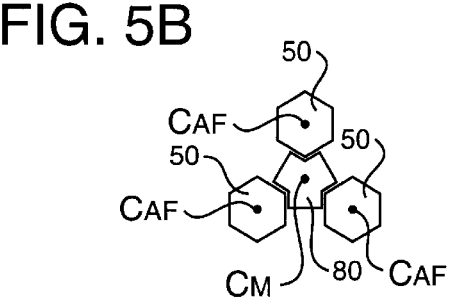
Figure 5C:
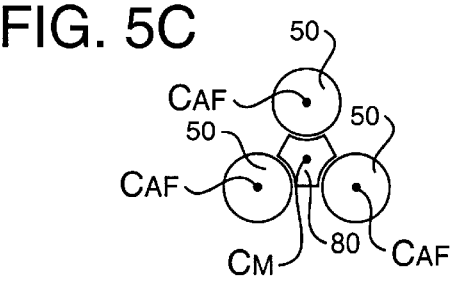
Figure 5D:
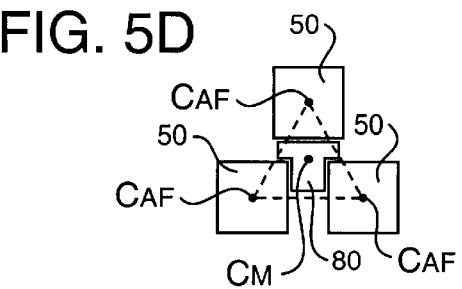

FIGS. 5A through 5D are samples of microspacer neighborhoods including three fiber segments 50 in contacting engagement with a precision microspacer in which the axial fiber centers $C_{AF}$, at the first ends 32 of the optical fibers 30 correspond to the vertices of an equilateral triangle. FIG. 5A shows three fiber segments 50 of circular cross-section in contacting engagement with a precision microspacer 80 of circular cross-section. FIG. 5B shows three fiber segments 50 of hexagonal cross-section in contacting engagement with a precision microspacer 80 having the cross-section of an irregular polygon in which three pairs of sides join at angles such that each such pair of sides accommodates two adjacent sides of a hexagonal fiber segment 50. FIG. 5C shows three fiber segments 50 of circular cross-section maintained in contacting engagement with a precision microspacer 80 having three equispaced concave surfaces, each such concave surface having a radius of curvature designed to receive one of the fiber segments 50 in complementary fashion. FIG. 5D is of three fiber segments 50 of square cross-section maintained in contacting engagement with a precision microspacer 80 having a "T"-shaped cross-section.

Figure 6A:
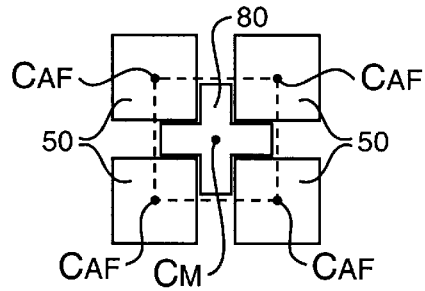
Figure 6B:
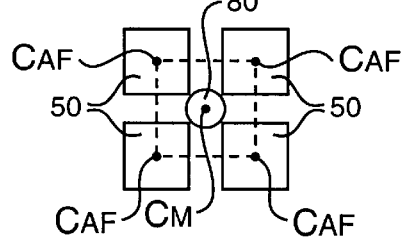
Figure 6C:
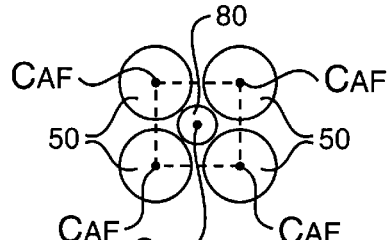
Figure 6D:
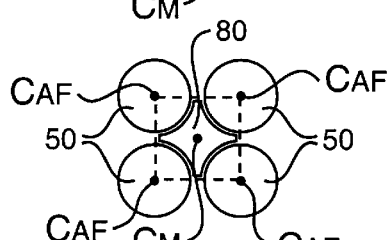
Figure 6E:
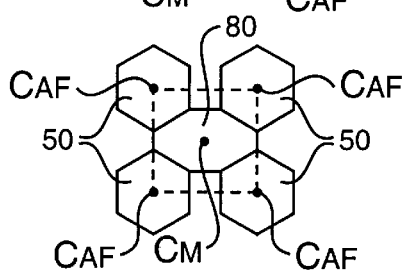
Figure 6F:
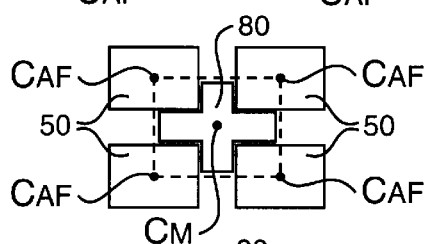
Figure 6G:
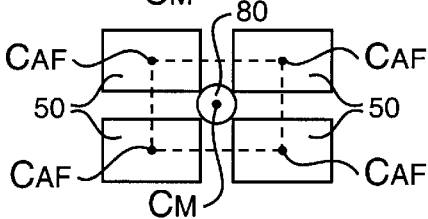

FIGS. 6A through 6G illustrate examples of microspacer neighborhoods that include four fiber segments. In FIGS. 6A through 6E, the axial fiber centers $C_{AF}$ correspond to the vertices of a square, which is both a regular polygon and a parallelogram. In FIGS. 6F and 6G, the axial fiber centers $C_{AF}$ correspond to the vertices of a rectangle, a parallelogram. FIG. 6A is of four fiber segments 50 of square cross-section maintained in contacting engagement with a precision microspacer 80 having a cross-shaped cross-section. FIG. 6B is of four fiber segments 50 of square cross-section maintained in contacting engagement with a precision microspacer 80 having a circular cross-section. FIG. 6C is of four fiber segments 50 of circular cross-section maintained in contacting engagement with a precision microspacer 80 having a circular cross-section. FIG. 6D is of four fiber segments 50 of circular cross-section maintained in contacting engagement with a precision microspacer 80 having four equispaced concave surfaces, each such concave surface having a radius of curvature designed to receive one of the fiber segments 50 in complementary fashion. FIG. 6E is of four fiber segments 50 of hexagonal cross-section maintained in contacting engagement with a precision microspacer 80 having the cross-section of an irregular eight-sided polygon. FIG. 6F is of four fiber segments 50 of rectangular cross-section maintained in contacting engagement with a precision microspacer 80 having a cross-shaped cross-section. FIG. 6G is of four fiber segments 50 of rectangular cross-section maintained in contacting engagement with a precision microspacer 80 having a circular cross-section. In the later two cases, the axial fiber centers $C_{AF}$ are arranged such that they correspond to the vertices of a rectangle.

Method of Fabricating an Aligned Fiber Array Using Microspacers as Applied to Optical Fiber Bundles which are at least Partially Fused Alternative methods for fabricating a corrected optical fiber bundle 20' with an aligned first-end fiber array 24' involve an uncorrected optical fiber bundle 20 in which the optical fibers 30 are fused together at least partially along their lengths.

One or more of these methods comprise some of the same steps as the more general method described in the previous section. To the extent that the steps are being performed on the same or similar types of components, or modified versions of the same or similar components, as those illustrated and discussed in connection with previous scenarios, the same reference numbers are used.

Figure 7A:
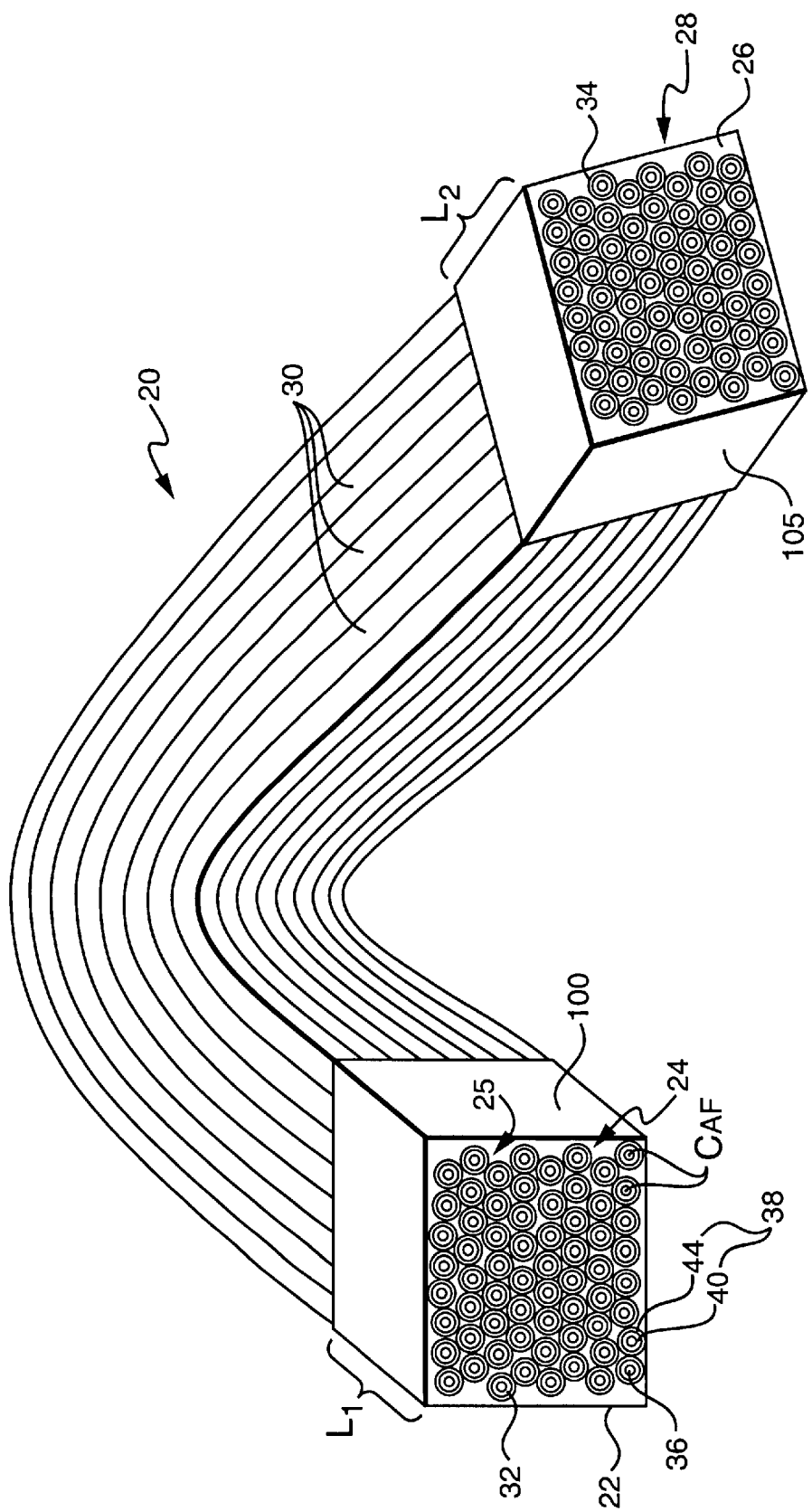
FIG. 7A is a perspective view of a partially fused uncorrected optical fiber bundle in which the optical fibers are each clad with an insoluble inner cladding and a soluble outer cladding and wherein the optical fibers are fused for a first length beginning at their first ends to form a first array fixture.

The method of fabrication may begin by providing an uncorrected optical fiber bundle 20 fabricated in accordance with known practices in the art of optical fiber fabrication for creating fused and flexible optical fiber bundles. Referring to FIG. 7A, a partially fused uncorrected optical fiber bundle 20 comprises a plurality of elongated optical fibers 30. Each optical fiber 30 has a first end 32 and a second end 34, a fiber core 36 and a concentric fiber cladding 38 disposed around the fiber core 36. The concentric fiber cladding 38 comprises an insoluble concentric inner cladding 40 around the fiber core 36 and a soluble concentric outer cladding 44 around the inner cladding 40 for purposes that will be appreciated more fully below.

Figure 7B:
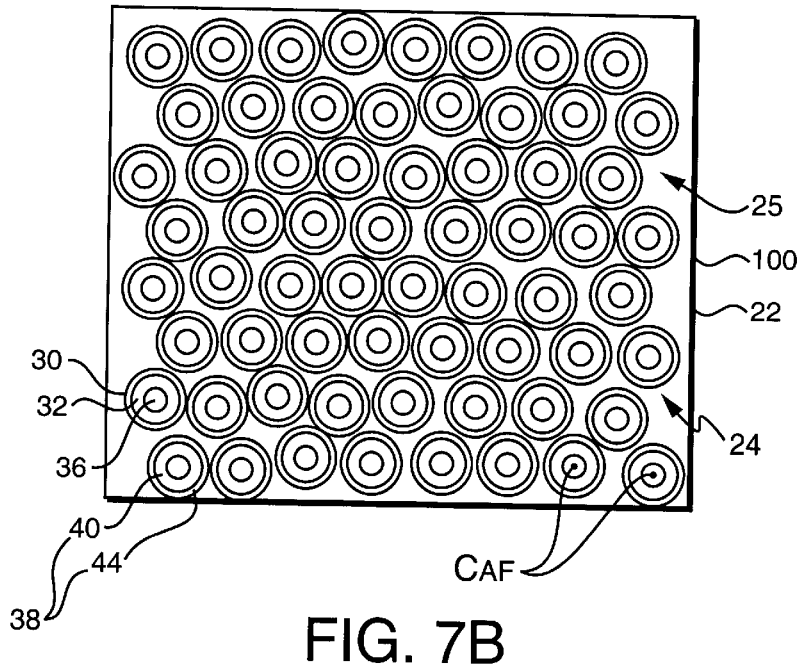
FIG. 7B is an end view of the optical fiber bundle shown in FIG. 7A.

The uncorrected optical fiber bundle 20 includes at least a first common end 22 at which the plurality of optical fibers 30 is aligned and fused together for a first length $L_1$ beginning at the first ends 32 of the optical fibers 30 and extending along the optical fibers 30 such that the first ends 32 of the optical fibers 30 are arranged in an uncorrected first-end fiber array 24 at an end face 25 as viewed into the first common end 22. See FIG. 7B for an enlarged end view into the first common end 22 (i.e., as viewed generally along the optical fibers 30).

FIGS. 7A illustrates an embodiment in which the uncorrected optical fiber bundle 20 also includes a second common end 26 at which the plurality of optical fibers 30 is aligned and fused together for a second length $L_2$ beginning at the second end 34 of each optical fiber 30 and extending along the optical fibers 30 such that the second ends 34 of the optical fibers 30 are arranged in an uncorrected second-end fiber array 28 as viewed into the second common end 26. The uncorrected second-end fiber array 28 may or may not be of a similar configuration to the uncorrected first-end fiber array 24.

In this method of fabrication, the first array fixture 100 is created by the fusing of adjacent optical fibers 30; more specifically, the fusing together of the soluble concentric outer claddings 44 of adjacent optical fibers 30 in the uncorrected optical fiber bundle 20. A second array fixture 105 formed in the same manner is also shown in FIG. 7A.

If warranted, before proceeding further in the process, the first common end 22 may be ground and polished to form a substantially smooth end face 25, which may be planar and generally perpendicular to the axial fiber centers $C_{AF}$, but which could also be convex, concave or curvilinear, for example.

Figure 7C:
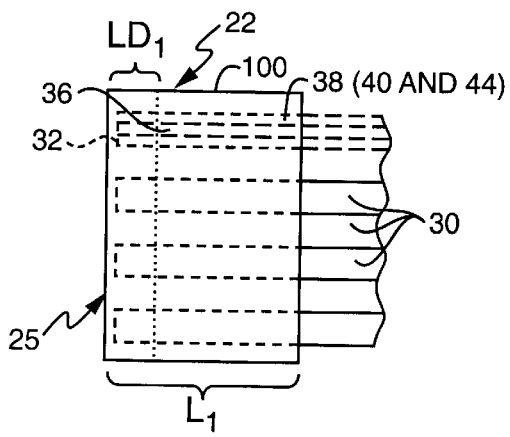
FIG. 7C is a side view of the first array fixture of the optical fiber bundle shown in FIGS. 7A and 7B.
Figure 7D:
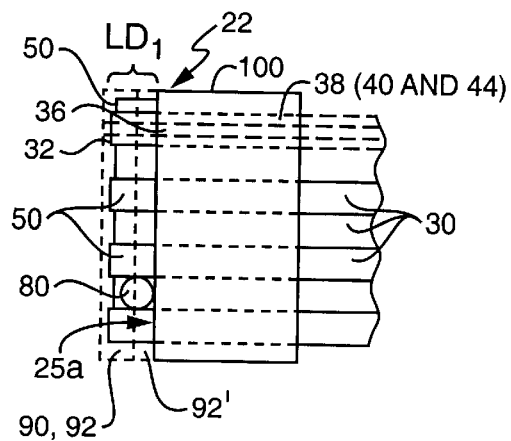
FIG. 7D is a side view of the first array fixture shown in FIG. 7C after a portion thereof has been leached to leave remaining an uncorrected first-end fiber array of fiber segments protruding from a recessed first array face and having interstices therebetween.
Figure 7E:
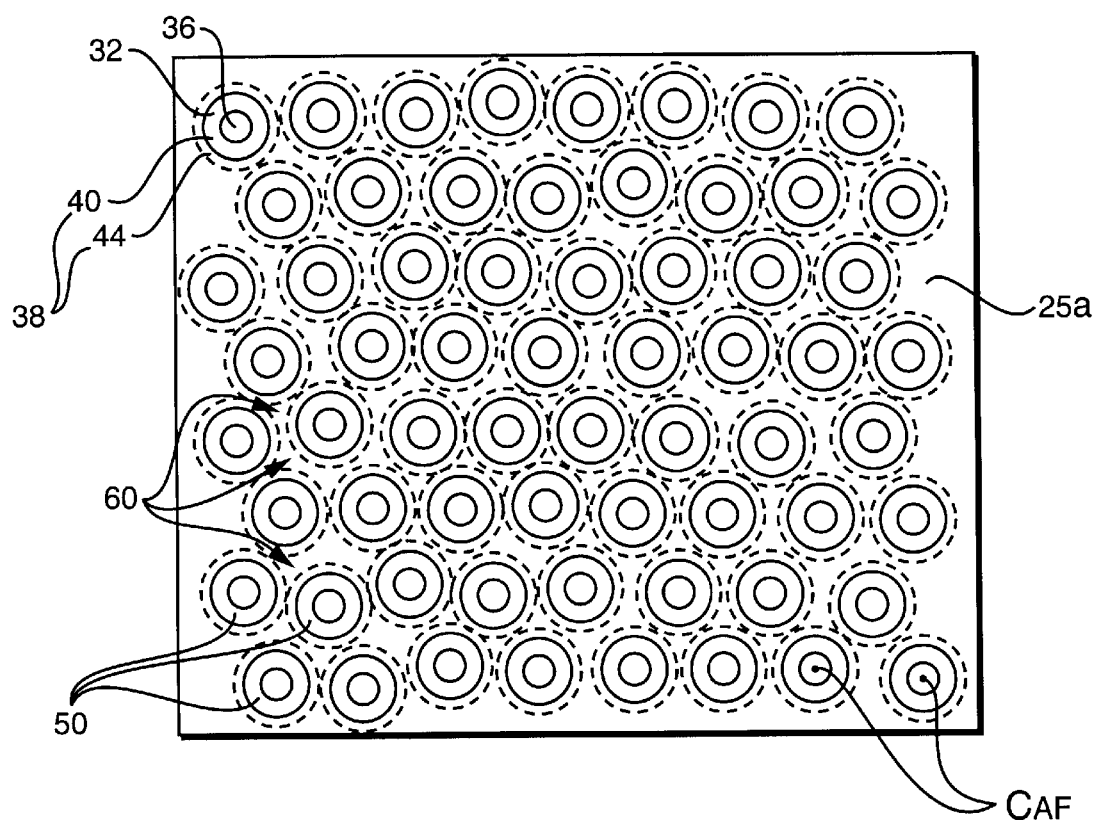
FIG. 7E is an end view of the uncorrected first-end fiber array of fiber segments shown in FIG. 7D.

Referring to FIGS. 7C and 7D, the first common end 22 is leached to a first leach depth $LD_1$ that is less than the first length $L_1$ along which the plurality of optical fibers 30 is fused in order to dissolve the soluble concentric outer claddings 44 from the optical fibers 30 along a portion of their lengths beginning at their first ends 32. By dissolving the soluble concentric outer claddings 44, the leaching leaves remaining the uncorrected first-end fiber array 24 of optical fibers 30, each optical fiber 30 of which now has its fiber core 36 and its insoluble concentric inner cladding 40 remaining along a fiber segment 50. The leaching also creates a recessed end face 25a from which the fiber segments 50 protrude. Furthermore, after leaching, there will be interstices 60 between the fiber segments 50 in the uncorrected first-end fiber array 24 for a length along the optical fibers 30 equal to the first leach depth $LD_1$. See the post-leaching end view of FIG. 7E for interstices 60.

Figure 7F:
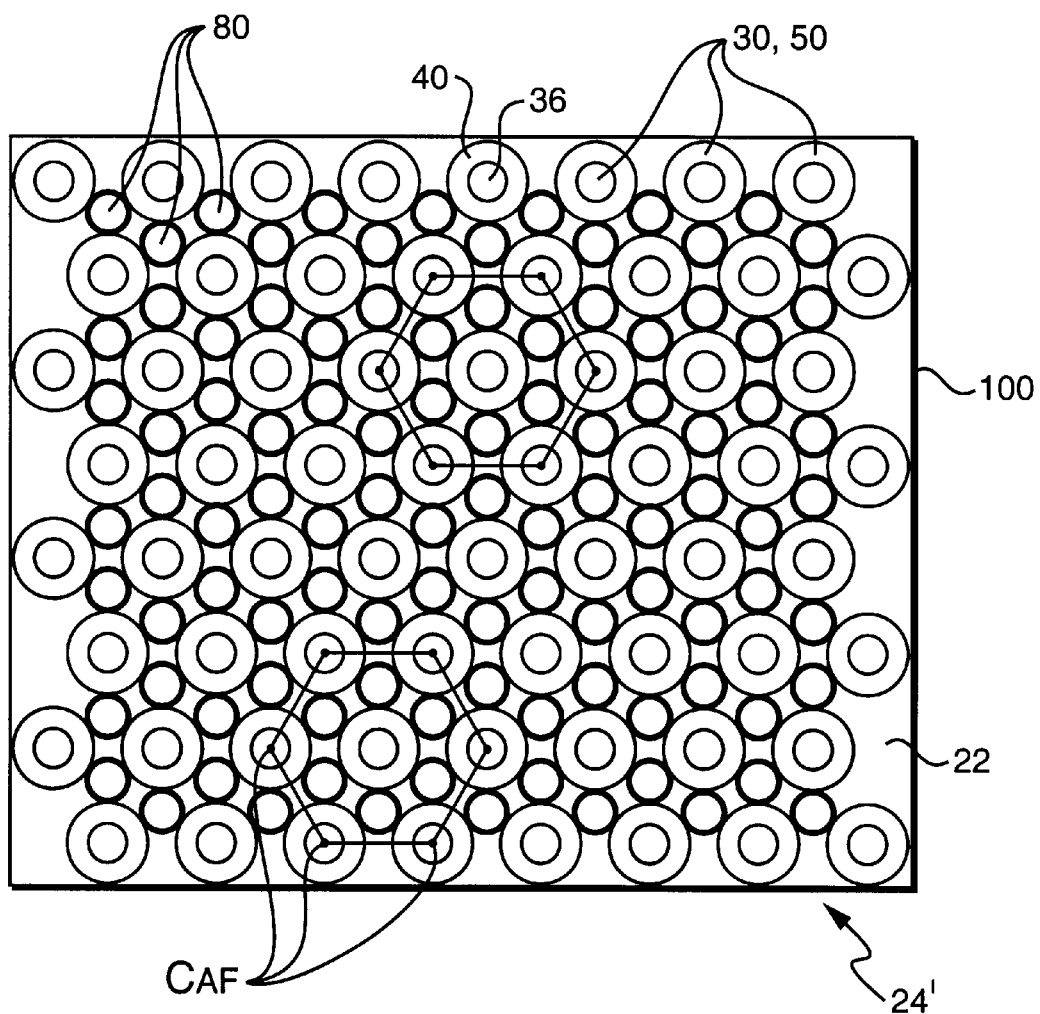
FIG. 7F is an end view of the first-end fiber array shown in FIGS. 7A through 7E after it has been corrected by the installation of precision microspacers into the interstices between the fiber segments and the securing of the fiber segments into contacting engagement with the precision microspacers.

Referring to FIG. 7F, after leaching, the positions of the axial fiber centers $C_{AF}$ at the first ends 32 of selected sets of optical fibers 30 are "corrected" (i.e., made more precise) by the installation of precision microspacers 80 into a selected plurality of interstices 60 between and adjacent the fiber segments 50 to define microspacer neighborhoods as previously described. It will be appreciated that the leach depth $LD_1$ must be sufficiently deep to leave remaining on each optical fiber 30 a fiber segment 50 that is sufficient in length to have a degree of lateral flexibility. Absent this parameter, attempted insertion of the precision microspacers 80 may be rendered impossible or may cause damage to individual optical fibers 30. More importantly, the purpose of inserting the precision microspacers 80 would be defeated if the fiber segments 50 could not be flexed into the desired position (i.e., toward their ideal lattice positions) by the insertion of precision microspacers 80.

Although this method may be more forgiving of alignment imprecision introduced during the heating and drawing of fused optical fiber bundles than other methods of fiber array fabrication, radical imprecision may be unsusceptible to correction by the installation of precision microspacers 80. As such, it is preferred that efforts at precision be made in fabrication of the uncorrected first-end fiber array 24. As with the scenarios previously described, if the first ends 32 of the optical fibers 30 deviate too far from their ideal lattice positions in the uncorrected first-end fiber array 24, they may not be able to be flexed far enough to satisfactorily approximate their ideal lattice positions. Secondly, as previously discussed, flexing a fiber segment 50 at angles greater than the maximum acceptance angle $\theta_M$ of the optical fiber 30 renders the optical fiber 30 incapable of receiving and transmitting an electromagnetic signal.

As previously described, the corrected first-end fiber array 24' is formed by the securing of the fiber segments 50 in each microspacer neighborhood into contacting engagement with the precision microspacer 80 to retain the axial fiber centers $C_{AF}$ at the first ends 32 of the optical fibers 30 in predetermined positions that more closely approximate their ideal lattice positions than the positions occupied by the axial fiber centers $C_{AF}$ in the uncorrected first-end fiber array 24.

To facilitate the installation of the precision microspacers 80, it may be useful to include the following additional step, which is discussed in conjunction with reference to FIG. 7D. Once the first common end 22 has been leached to a first leach depth $LD_1$, a temporary retention layer 90 is applied to the recessed end face 25a. The temporary retention layer 90 may be an adhesive or wax layer 92, for example. However, because use of a wax layer 92 has proven particularly effective, this step is discussed in relation to use of a wax layer 92. The leached area is filled with a wax layer 92 such that the interstices between the fiber segments 50 are occupied by the wax layer 92. Next, a recess may be created in the wax layer 92 such that there remains the uncorrected first-end fiber array 24 of fiber segments 50 projecting through a recessed wax layer 92' that is disposed on the recessed end face 25a. Suggestions for recessing the wax layer 92 include applying a wax solvent to the wax-filled first common end 22 or applying heat to melt the wax layer 90 to the desired depth. Once the recessed wax layer 92' has been created, the precision microspacers 80 are installed by inserting them between the fiber segments 50, as previously described, and imbedding them in the recessed wax layer 92' by which recessed wax layer 92' they will be temporarily retained. FIG. 7D illustrates a single spherical precision microspacer 80 imbedded in a recessed wax layer 92'.

Subsequent to the installation of the precision microspacers 80, the fiber segments 50 and the precision microspacers 80 are urged into contacting engagement and permanently secured by one or more of the methods discussed previously.

The use of a temporary retention layer 90 is not limited to methods involving partially fused optical fiber bundles 20 and may be employed in connection with the more general method(s) described in the previous section.

The foregoing is considered to be illustrative only of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention as expressed in the following claims.

What is claimed is:

1. An optical fiber bundle having an aligned first-end fiber array and comprising:

a plurality of optical fibers each of which has first and second ends and an axial fiber center, the optical fiber bundle having a first common end proximate to which the optical fibers are secured in place by a first array fixture such that a fiber segment adjacent the first end of each optical fiber protrudes from the first array fixture and wherein each fiber segment of a selected plurality of fiber segments belongs to at least one microspacer neighborhood, each microspacer neighborhood comprising at least two fiber segments secured in contacting engagement with a precision microspacer installed between the at least two fiber segments such that the axial fiber centers at the first ends of the at least two fiber segments are maintained in predetermined array positions with respect to one another.

2. The optical fiber bundle according to claim 1 wherein each precision microspacer is in the form of one of a microrod and a microsphere and has a microspacer center.

3. The optical fiber bundle according to claim 2 wherein the first-end fiber array includes microspacer neighborhoods comprising at least three fiber segments and the fiber segments in any such microspacer neighborhood are of similar cross-sectional geometry and substantially equal diameter and secured in contacting engagement with the precision microspacer such that the fiber segments are substantially parallel to one another and the microspacer center is substantially equidistant from the axial fiber centers.

4. The optical fiber bundle according to claim 3 wherein, in microspacer neighborhoods comprising at least three fiber segments of similar cross-sectional geometry and substantially equal diameter secured in contacting engagement with the precision microspacer such that the microspacer center is substantially equidistant from the axial fiber centers, the axial fiber centers are furthermore substantially equispaced about the microspacer center such that the positions of the axial fiber centers at the first ends of the optical fibers correspond to the vertices of an imaginary regular polygon the perimeter of which imaginary regular polygon encloses the precision microspacer.

5. The optical fiber bundle according to claim 4 wherein the first array fixture comprises the fused claddings of the optical fibers within the optical fiber bundle.

6. The optical fiber bundle according to claim 2 wherein all of the fiber segments are of similar cross-sectional geometry and substantially equal diameter and wherein every fiber segment is among the selected plurality of fiber segments belonging to at least one microspacer neighborhood.

7. The optical fiber bundle according to claim 2 wherein the first-end fiber array includes microspacer neighborhoods in which the fiber segments are secured in contacting engagement with the precision microspacer such that the fiber segments are substantially parallel to one another and such that the microspacer center is substantially equidistant from the axial fiber centers.

8. The optical fiber bundle according to claim 1 wherein the first array fixture comprises the fused claddings of the optical fibers within the optical fiber bundle.

9. The optical fiber bundle according to claim 1 wherein each microspacer neighborhood comprises at least three fiber segments secured in contacting engagement with a precision microspacer and the fiber segments in each microspacer neighborhood are of similar cross-sectional geometry and substantially equal diameter and wherein the predetermined positions in which the axial fiber centers at the first ends of the optical fibers are maintained correspond to at least one of (i) the vertices of an imaginary regular polygon and (ii) the vertices of an imaginary parallelogram, the perimeter of which at least one of an imaginary regular polygon and parallelogram encloses the precision microspacer.

10. The optical fiber bundle according to claim 9 wherein all of the fiber segments protruding from the first array fixture are of similar cross-sectional geometry and substantially equal diameter and wherein every fiber segment protruding from the first array fixture is among the selected plurality of fiber segments belonging to at least one microspacer neighborhood.

11. The optical fiber bundle according to claim 10 further including a peripheral binding structure applied around the periphery of the fiber segments, the peripheral binding structure exerting an inwardly directed binding force to maintain the fiber segments in contacting engagement with the precision microspacers.

12. The optical fiber bundle according claim 11 wherein each precision microspacer is in the form of one of a microrod and a microsphere.

13. The optical fiber bundle according to claim 10 wherein the precision microspacers are maintained in contacting engagement with the fiber segments by a binding adhesive applied to the fiber segments and the precision microspacers.

14. The optical fiber bundle according to claim 9 wherein the precision microspacers are maintained in contacting engagement with the fiber segments by a binding adhesive applied to the fiber segments and the precision microspacers.

15. The optical fiber bundle according to claim 14 wherein each precision microspacer is in the form of one of a microrod and a microsphere.

16. The optical fiber bundle according to claim 9 wherein each precision microspacer is in the form of one of a microrod and a microsphere.

17. The optical fiber bundle according to claim 1 wherein each microspacer neighborhood comprises four fiber segments secured in contacting engagement with a precision microspacer and the fiber segments in each microspacer neighborhood are of similar cross-sectional geometry and substantially equal diameter and wherein the predetermined positions in which the axial fiber centers at the first ends of the optical fibers are maintained correspond to the vertices of an imaginary parallelogram the perimeter of which imaginary parallelogram encloses the precision microspacer.

18. The optical fiber bundle according to claim 17 wherein the imaginary parallelogram the vertices to which the predetermined positions of the axial fiber centers at the first ends of the optical fibers correspond is a rectangle.

19. A method of fabricating an optical fiber bundle having an aligned fiber array using precision microspacers and comprising the steps of:

providing an optical fiber bundle comprising a plurality of elongated optical fibers each of which has first and second ends and an axial fiber center, the optical fiber bundle having at least a first common end proximate to which the optical fibers are aligned and retained by a first array fixture such that a fiber segment of each optical fiber protrudes beyond the first array fixture to the first end of the optical fiber, the fiber segments collectively having interstices therebetween and the axial fiber centers at the first ends of the optical fibers being arranged in an uncorrected first-end fiber array with respect to an ideal lattice relative to which there exists an ideal lattice position for the axial fiber center at the first end of each optical fiber;

installing a precision microspacer having a microspacer center into each interstice of a selected plurality of interstices to create microspacer neighborhoods, each microspacer neighborhood comprising a single microspacer located between at least two fiber segments; and securing the fiber segments in each microspacer neighborhood into contacting engagement with the precision microspacer such that the axial fiber centers at the first ends of the optical fibers are maintained in predetermined relative positions that more closely approximate ideal lattice positions than the positions the axial fiber centers occupied in the uncorrected first-end fiber array.

20. An optical fiber bundle having an aligned first-end fiber array fabricated in accordance with the method of claim 19.

21. The method according to claim 19 wherein securing the fiber segments in each microspacer neighborhood into contacting engagement with the precision microspacer comprises applying a bonding adhesive to the fiber segments and the precision microspacer.

22. The method according to claim 19 wherein the step of providing an optical fiber bundle further comprises providing an optical fiber bundle in which the fiber segments protruding beyond the first array fixture are of similar cross-sectional geometry and substantially equal diameter.

23. The method according to claim 22 wherein each microspacer neighborhood comprises at least three fiber segments and wherein securing the fiber segments in each microspacer neighborhood comprises securing the fiber segments into contacting engagement with the precision microspacer such that the axial fiber centers at the first end of the optical fibers are maintained in predetermined relative positions that correspond to at least one of (i) the vertices of an imaginary regular polygon and (ii) the vertices of an imaginary parallelogram, the perimeter of the at least one of an imaginary regular polygon and parallelogram enclosing the precision microspacer.

24. The method according to claim 23 wherein the selected plurality of interstices is such that every fiber segment protruding beyond the first array fixture belongs to at least one microspacer neighborhood; and wherein securing the fiber segments in contacting engagement with the precision microspacers comprises at least one of (i) applying a bonding adhesive to the precision microspacers and the fiber segments individually, (ii) applying a bonding adhesive to the precision microspacers and the fiber segments collectively and (iii) applying a peripheral binding structure around the periphery of the fiber segments.

25. The method according to claim 24 wherein each microspacer is in the form of one of a microrod and a microsphere.

26. An optical fiber bundle having an aligned first-end fiber array fabricated in accordance with the method of claim 25.

27. The method according to claim 19 wherein providing an optical fiber bundle further comprises providing an optical fiber bundle in which the fiber segments protruding beyond the first array fixture are of similar cross-sectional geometry and substantially equal diameter; the selected plurality of interstices is such that every fiber segment protruding beyond the first array fixture belongs to at least one microspacer neighborhood; and wherein securing the fiber segments in contacting engagement with the precision microspacers comprises at least one of (i) applying a bonding adhesive to the precision microspacers and the fiber segments individually, (ii) applying a bonding adhesive to the precision microspacers and the fiber segments collectively and (iii) applying a peripheral binding structure around the periphery of the fiber segments.

28. The method according to claim 27 wherein each microspacer neighborhood comprises at least three fiber segments and wherein securing the fiber segments in each microspacer neighborhood comprises securing the fiber segments into contacting engagement with the precision microspacer such that the axial fiber centers at the first end of the optical fibers are maintained in predetermined relative positions that correspond to at least one of (i) the vertices of an imaginary regular polygon and (ii) the vertices of an imaginary parallelogram, the perimeter of the at least one of an imaginary regular polygon and parallelogram enclosing the precision microspacer.

29. An optical fiber bundle having an aligned first-end fiber array fabricated in accordance with the method of claim 27.

30. A method of fabricating an optical fiber bundle having a precisely aligned optical fiber array using precision microspacers and comprising the steps of:

providing an optical fiber bundle comprising a plurality of elongated optical fibers each of which has first and second ends and includes a fiber core having an axial fiber center, an insoluble concentric inner cladding around the fiber core and a soluble concentric outer cladding around the inner cladding, the optical fiber bundle having at least a first common end at which the plurality of optical fibers is aligned and fused into a first array fixture for a first length beginning at the first ends and extending along the optical fibers such that the first ends of the optical fibers at an end face of the first array fixture are arranged in an uncorrected first-end fiber array with respect to an ideal lattice relative to which there exists an ideal lattice position for the axial fiber center at the first end of each optical fiber;

leaching the first common end of the optical fiber bundle to a leach depth that is less than the first length to dissolve the soluble concentric outer cladding from the optical fibers along a portion of the lengths there extending between the first ends and a recessed first array face on the fused remainder of the first array fixture such that a fiber segment having a fiber core and an insoluble concentric inner cladding remains adjacent the first end of each leached optical fiber and protrudes out of the recessed first array face and that there exist interstices between the fiber segments in the uncorrected first-end fiber array;

installing a precision microspacer having a microspacer center into each interstice of a selected plurality of interstices to create microspacer neighborhoods, each microspacer neighborhood comprising a single microspacer located between at least two fiber segments; and securing the fiber segments in each microspacer neighborhood into contacting engagement with the precision microspacer such that the axial fiber centers at the first ends of the optical fibers are maintained in predetermined relative positions that more closely approximate ideal lattice positions than the positions the axial fiber centers occupied in the uncorrected first-end fiber array.

31. An optical fiber bundle having an aligned first-end fiber array fabricated in accordance with the method of claim 30.

32. The method according to claim 30 further comprising the step of applying a temporary restraining layer to the recessed first array face before installing the precision microspacers to temporarily restrain the precision microspacers in their respective interstices before securing each precision microspacer in contacting engagement with the fiber segments in its microspacer neighborhood.

33. The method according to claim 32 wherein the temporary restraining layer comprises a wax layer.

34. The method according to claim 30 wherein securing the fiber segments in each microspacer neighborhood into contacting engagement with the precision microspacer comprises applying a bonding adhesive to the fiber segments and the precision microspacer.

35. The method according to claim 30 wherein the step of providing an optical fiber bundle further comprises providing an optical fiber bundle in which the fiber segments protruding beyond the first array fixture are of similar cross-sectional geometry and substantially equal diameter.

36. The method according to claim 35 wherein each microspacer neighborhood comprises at least three fiber segments and wherein securing the fiber segments in each microspacer neighborhood comprises securing the fiber segments into contacting engagement with the precision microspacer such that the axial fiber centers at the first end of the optical fibers are maintained in predetermined relative positions that correspond to at least one of (i) the vertices of an imaginary regular polygon and (ii) the vertices of an imaginary parallelogram, the perimeter of the at least one of an imaginary regular polygon and parallelogram enclosing the precision microspacer.

37. The method according to claim 36 wherein the selected plurality of interstices is such that every fiber segment protruding beyond the first array fixture belongs to at least one microspacer neighborhood; and wherein securing the fiber segments in contacting engagement with the precision microspacers comprises at least one of (i) applying a bonding adhesive to the precision microspacers and the fiber segments individually, (ii) applying a bonding adhesive to the precision microspacers and the fiber segments collectively and (iii) applying a peripheral binding structure around the periphery of the fiber segments.

38. The method according to claim 37 wherein each microspacer is in the form of one of a microrod and a microsphere.

39. An optical fiber bundle having an aligned first-end fiber array fabricated in accordance with the method of claim 38.

40. The method according to claim 30 wherein providing an optical fiber bundle further comprises providing an optical fiber bundle in which the fiber segments protruding beyond the first array fixture are of similar cross-sectional geometry and substantially equal diameter; the selected plurality of interstices is such that every fiber segment protruding beyond the first array fixture belongs to at least one microspacer neighborhood; and wherein securing the fiber segments in contacting engagement with the precision microspacers comprises at least one of (i) applying a bonding adhesive to the precision microspacers and the fiber segments individually, (ii) applying a bonding adhesive to the precision microspacers and the fiber segments collectively and (iii) applying a peripheral binding structure around the periphery of the fiber segments.

41. The method according to claim 40 wherein each microspacer neighborhood comprises at least three fiber segments and wherein securing the fiber segments in each microspacer neighborhood comprises securing the fiber segments into contacting engagement with the precision microspacer such that the axial fiber centers at the first end of the optical fibers are maintained in predetermined relative positions that correspond to at least one of (i) the vertices of an imaginary regular polygon and (ii) the vertices of an imaginary parallelogram, the perimeter of the at least one of an imaginary regular polygon and parallelogram enclosing the precision microspacer.

42. An optical fiber bundle having an aligned first-end fiber array fabricated in accordance with the method of claim 40.

* * * * *